United States Patent
Sambamoorthy et al.

(10) Patent No.: US 11,768,950 B2
(45) Date of Patent: Sep. 26, 2023

(54) METHOD FOR DATA PROTECTION ACROSS SHARING PLATFORMS

(71) Applicant: ArmorBlox, Inc., Sunnyvale, CA (US)

(72) Inventors: Arjun Sambamoorthy, Sunnyvale, CA (US); Prashanth Arun, Sunnyvale, CA (US); Dhananjay Sampath, Sunnyvale, CA (US); Sanjay Singh, Sunnyvale, CA (US); Salil Kanetkar, Sunnyvale, CA (US)

(73) Assignee: ArmorBlox, Inc., Sunnyvale, CA (US)

( * ) Notice: Subject to any disclaimer, the term of this patent is extended or adjusted under 35 U.S.C. 154(b) by 0 days.

(21) Appl. No.: 17/891,448

(22) Filed: Aug. 19, 2022

(65) Prior Publication Data

US 2023/0056471 A1   Feb. 23, 2023

Related U.S. Application Data

(60) Provisional application No. 63/235,366, filed on Aug. 20, 2021.

(51) Int. Cl.
| | |
|---|---|
| *G06F 21/62* | (2013.01) |
| *G06F 40/40* | (2020.01) |
| *G06F 21/60* | (2013.01) |
| *H04L 51/08* | (2022.01) |

(52) U.S. Cl.
CPC ........ *G06F 21/6209* (2013.01); *G06F 21/604* (2013.01); *G06F 40/40* (2020.01); *H04L 51/08* (2013.01); *G06F 2221/2141* (2013.01)

(58) Field of Classification Search
CPC .............. G06F 21/6209; G06F 21/604; G06F 2221/2141; H04L 51/08
See application file for complete search history.

(56) References Cited

U.S. PATENT DOCUMENTS

| | | | |
|---|---|---|---|
| 2018/0082069 A1* | 3/2018 | Cunico | G06F 21/604 |
| 2020/0259933 A1* | 8/2020 | Goodyear | H04L 69/22 |
| 2021/0256147 A1* | 8/2021 | Gupta | G06F 21/6218 |

\* cited by examiner

*Primary Examiner* — Vance M Little
(74) *Attorney, Agent, or Firm* — Run8 Patent Group, LLC; Peter Miller; Brian T. Chew

(57) ABSTRACT

A method includes: accessing a corpus of messages previously sent from a user account; correlating sequences of words, in the corpus of messages, with behavior signals; aggregating the behavior signals into a behavioral model representing combinations of behavior signals characteristic of behavior in messages sent from the user account; later, accessing a message outbound from the user account to a recipient account, the message including a document associated with a document tag; correlating sequences of words, in the message, with behavior signals; retrieving a data access policy including a threshold at which access to a document associated with the document tag is restricted; and in response to detecting a difference between the behavioral signals from the message and the behavioral model exceeding the threshold, restricting access, by the recipient account, to the document in the message.

19 Claims, 6 Drawing Sheets

US 11,768,950 B2

METHOD FOR DATA PROTECTION ACROSS SHARING PLATFORMS

CROSS-REFERENCE TO RELATED APPLICATIONS

This application claims the benefit of U.S. Provisional Application No. 63/235,366, filed on 20 Aug. 2021, which is incorporated in its entirety by this reference.

TECHNICAL FIELD

This invention relates generally to the field of information security and more specifically to a new and useful method for protecting data across sharing platforms in the field of information security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
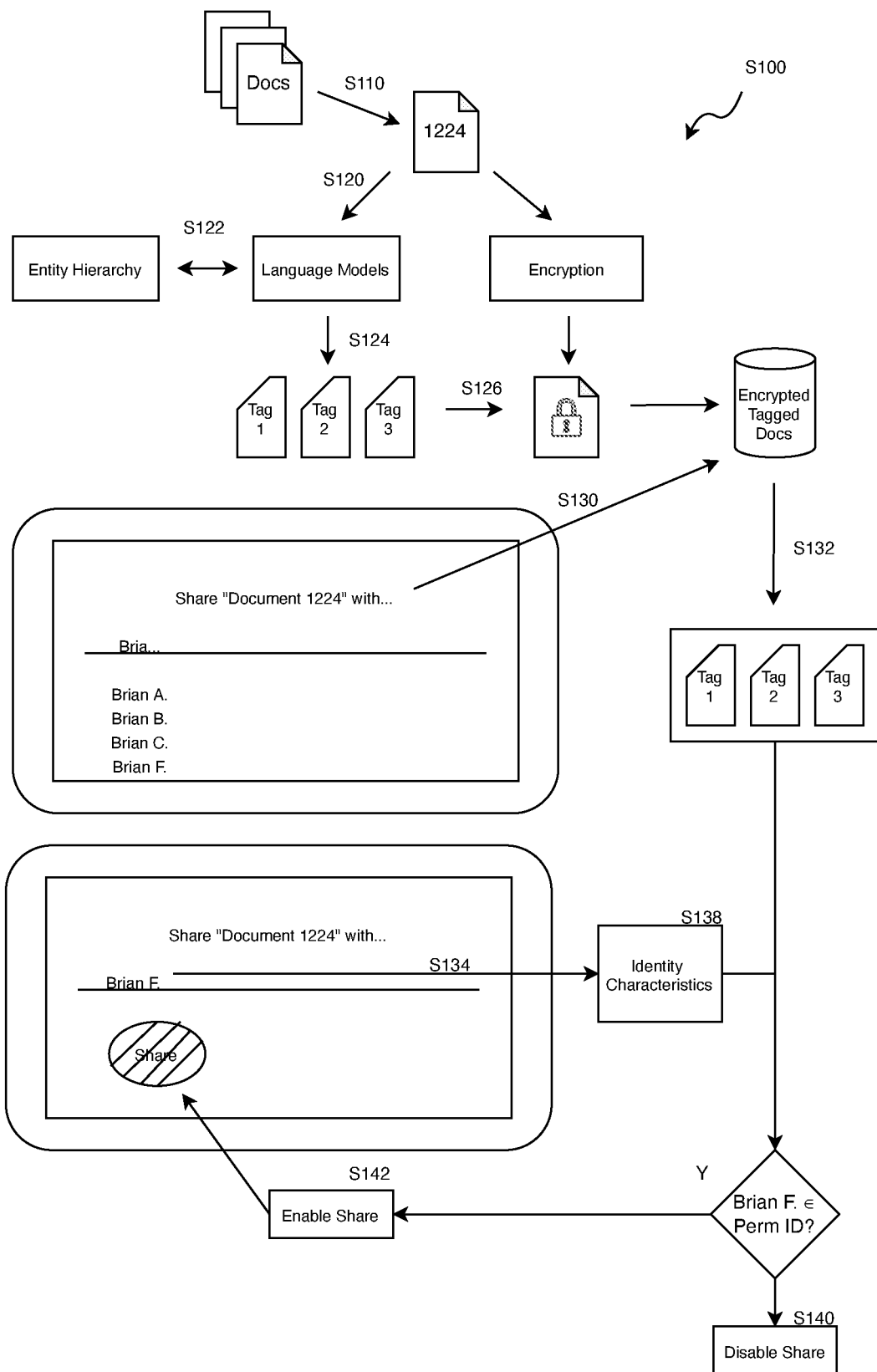
FIG. 1 is a flowchart representation of a method.
Figure 2A:
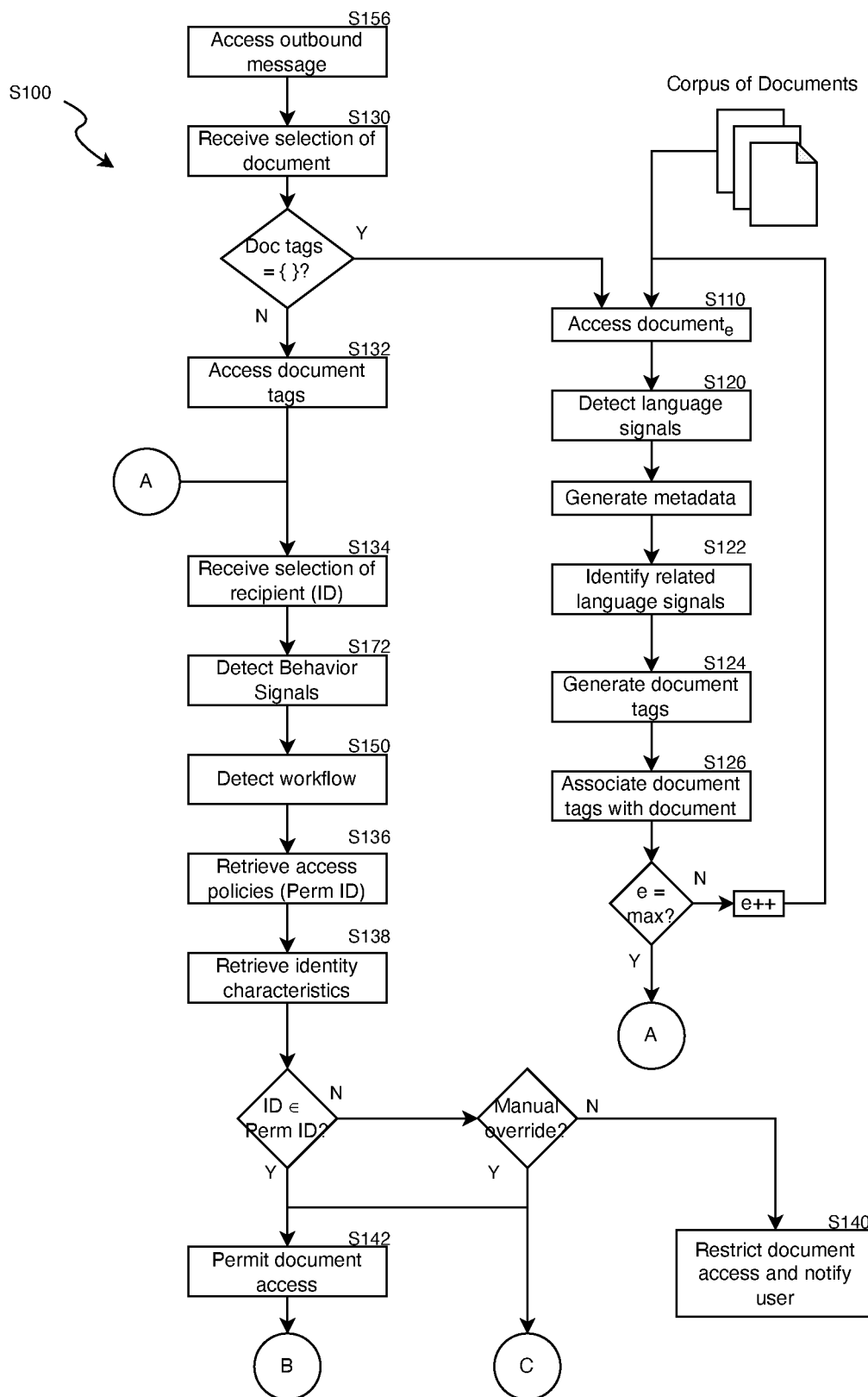
FIGS. 2A, 2B, and 2C are flowchart representations of one variation of the method.
Figure 2B:
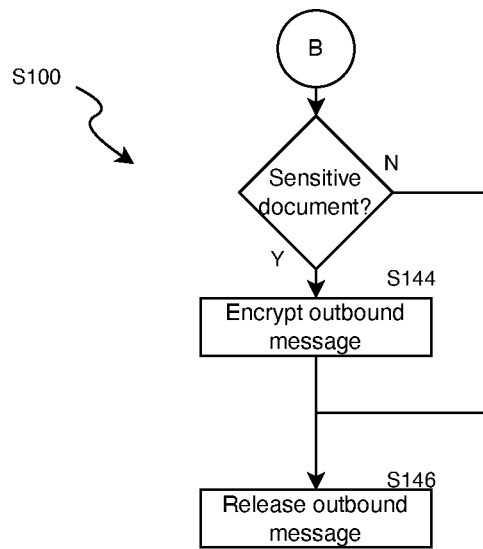
Figure 2C:
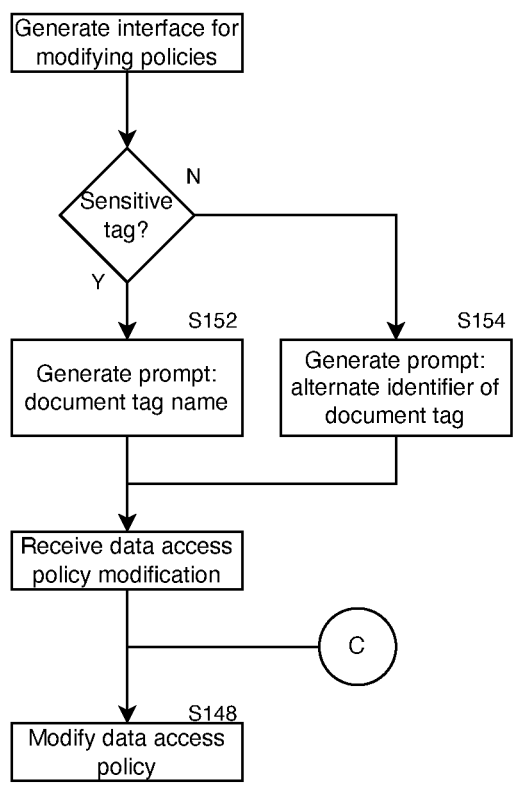

As shown in FIGS. 1, 2A, 2B, and 2C, a method S100 includes, during a first time period: accessing a corpus of documents in Block S110; for each document in the corpus of documents, correlating sequences of words, in a respective document, with a respective set of language signals in Block S120; generating a respective set of document tags representing the respective set of language signals in Block S124; and associating the respective set of document tags with the respective document in Block S126.

The method S100 further includes, during a second time period succeeding the first time period: receiving selection of a first document in the corpus of documents in Block S130; accessing a first set of document tags associated with the first document in Block S132; retrieving a first set of data access policies associated with the first set of document tags in Block S136, the first set of data access policies including a first data access policy associated with a first document tag in the first set of document tags, and including a first set of identities permitted to access a document associated with the first document tag; receiving selection of a first recipient account of the first document in Block S134; and, in response to detecting the first set of identities excluding the first recipient account, restricting access to the first document by the first recipient account in Block S140.

1.1 Data Access Control Based on Identity Characteristic

As shown in FIGS. 1, 2A, 2B, and 2C, another variation of the method S100 includes, during a first time period: accessing a corpus of documents in Block S110; for each document in the corpus of documents, correlating sequences of words, in a respective document, with a respective set of language signals in Block S120; generating a respective set of document tags representing the respective set of language signals in Block S124; and associating the respective set of document tags with the respective document in Block S126.

This variation of the method S100 further includes, during a second time period succeeding the first time period: receiving selection of a first document in the corpus of documents in Block S130; accessing a first set of document tags associated with the first document in Block S132; retrieving a first set of data access policies associated with the first set of document tags in Block S136, the first set of data access policies including a first data access policy associated with a first document tag in the first set of document tags, and including a first set of identity characteristics of a user account permitted to access a document associated with the first document tag; receiving selection of a first recipient account of the first document in Block S134; retrieving a second set of identity characteristics associated with the first recipient account in Block S138; and, in response to detecting the first set of identity characteristics excluding the second set of identity characteristics, restricting access to the first document by the first recipient account in Block S140.

1.2 Data Access Control Based on Sender Identity

As shown in FIGS. 1, 2A, 2B, and 2C, another variation of the method S100 includes: receiving selection, from a user account, of a first document in Block S130; correlating sequences of words, in the first document, with a set of language signals in Block S120; generating a set of document tags representing the set of language signals in Block S124; associating the set of document tags with the first document in Block S126; retrieving a set of data access policies associated with the set of document tags in Block S136, the set of data access policies including a first data access policy associated with a first document tag in the first set of document tags, and including a set of identities permitted to access a document associated with the first document tag; receiving selection, from the user account, of a recipient account of the first document in Block S134; and, in response to detecting the set of identities excluding the user account, restricting access to the first document by the recipient account in Block S140.

1.3 User Behavior in Message Including Document Attachment

Figure 3A:
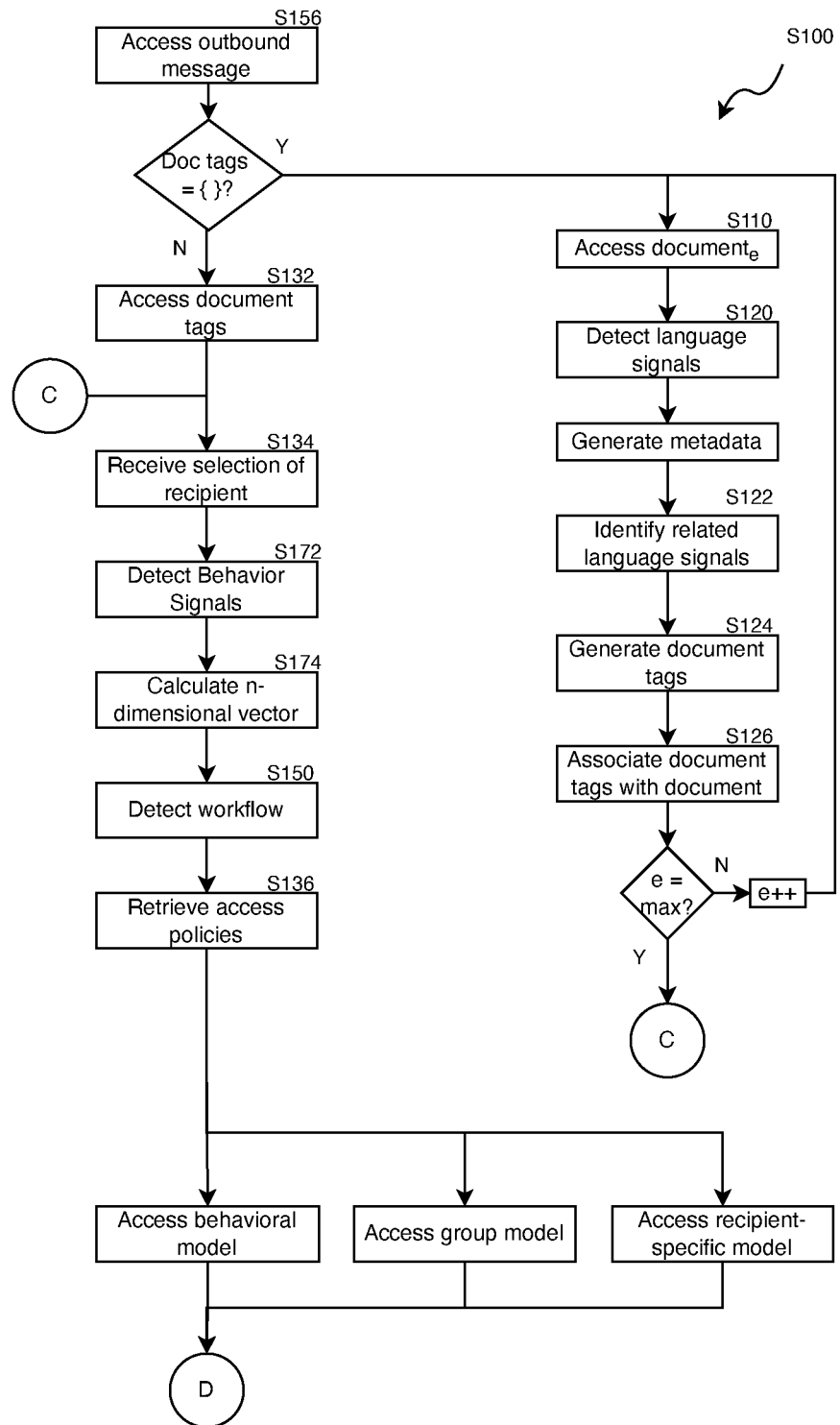
FIGS. 3A and 3B are flowchart representations of one variation of the method.
Figure 3B:
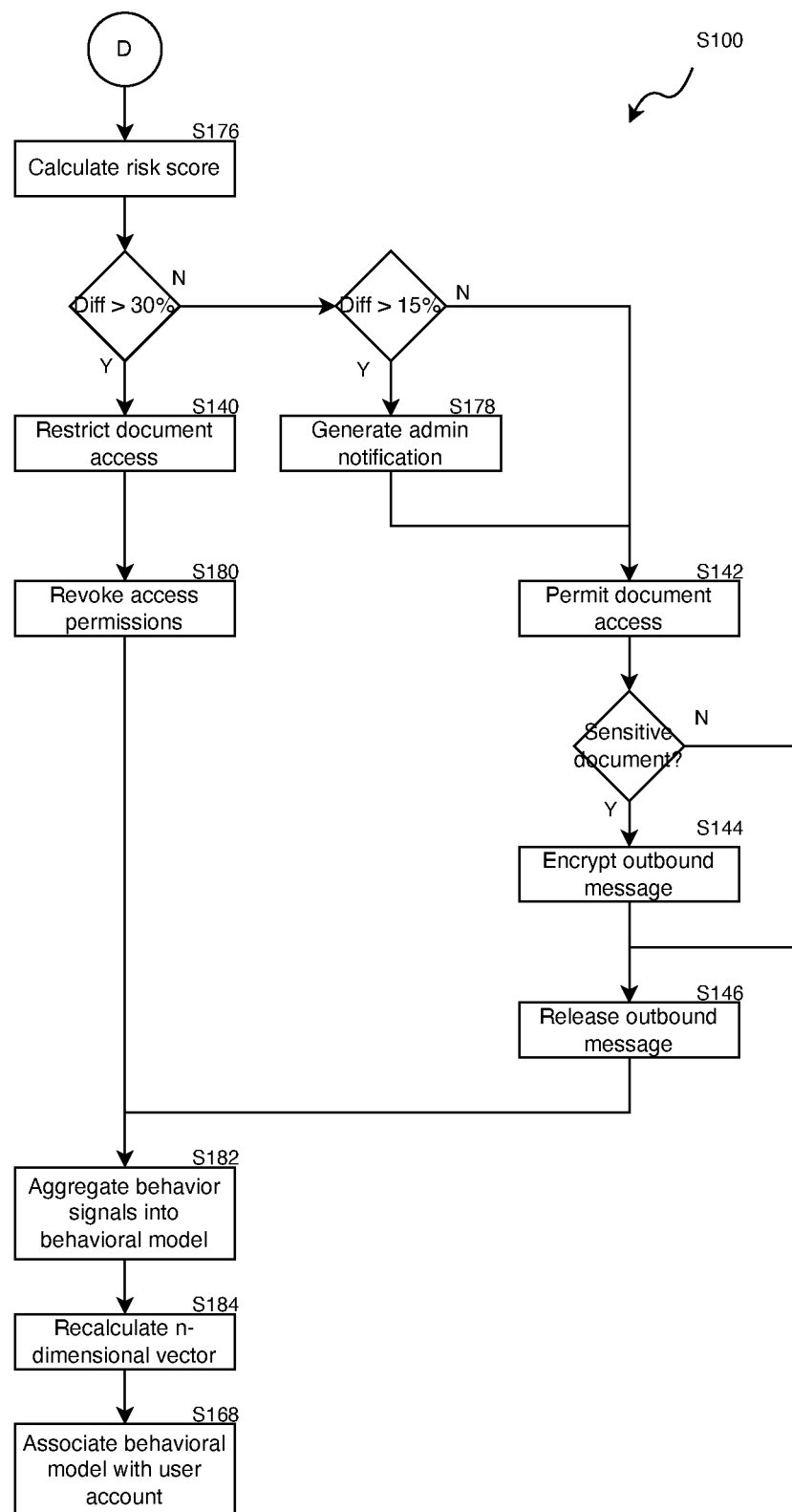
Figure 4:
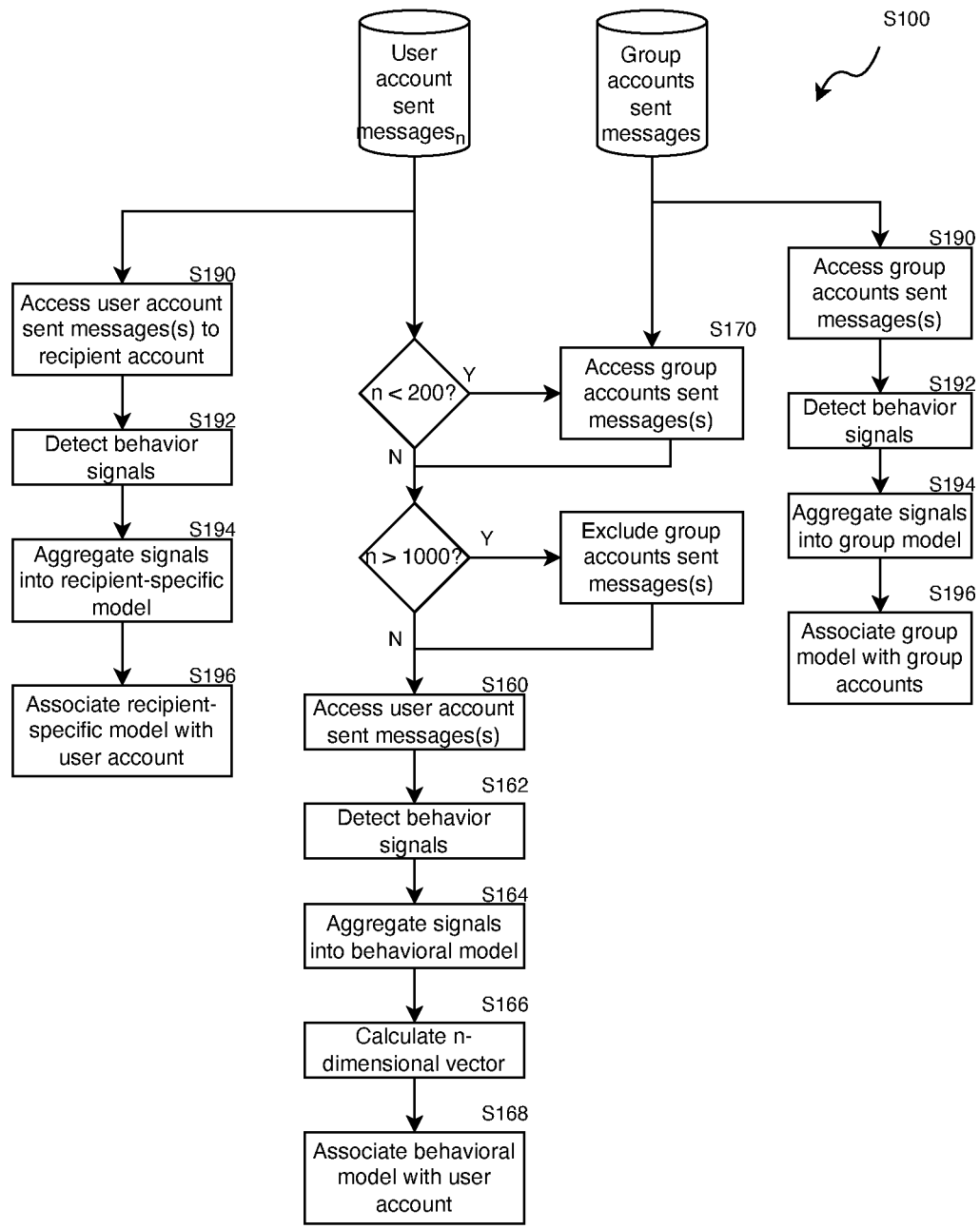
FIG. 4 is a flowchart representation of one variation of the method.

As shown in FIGS. 1, 3A, 3B, and 4, yet another variation of the method S100 includes, during a first time period: accessing a first corpus of messages sent from a first user account in Block S160; correlating sequences of words, in messages of the first corpus of messages, with a first set of behavior signals in Block S162; aggregating the first set of behavior signals into a first behavioral model representing combinations of behavior signals, in the first set of behavior signals, characteristic of behavior in messages sent from the first user account in Block S164; and associating the first behavioral model with the first user account in Block S168.

This variation of the method S100 further includes, during a second time period succeeding the first time period: accessing a first message outbound from the first user account to a first recipient account in Block S156, the first message including a first document as an attachment to the first message; correlating sequences of words, in the first message, with a second set of behavior signals in Block S172; accessing a first set of document tags associated with the first document in Block S132; retrieving a first data access policy, in Block S136: associated with a first document tag in the first set of document tags; and including a first threshold at which access to a document associated with the first document tag is restricted; and, in response to detecting a difference between the second set of behavioral signals and the first behavioral model exceeding the first threshold, restricting access, by the first recipient account, to the first document in the first message in Block S140.

1.4 User Behavior in Message Including Hyperlink to Location of Document

As shown in FIGS. 1, 3A, 3B, and 4, yet another variation of the method S100 includes, during a first time period: accessing a first corpus of messages sent from a first user account in Block S160; correlating sequences of words, in messages of the first corpus of messages, with a first set of behavior signals in Block S162; aggregating the first set of behavior signals into a first behavioral model representing combinations of behavior signals, in the first set of behavior signals, characteristic of behavior in messages sent from the first user account in Block S164; and associating the first behavioral model with the first user account in Block S168.

This variation of the method S100 further includes, during a second time period succeeding the first time period: accessing a first message outbound from the first user account to a first recipient account in Block S156, the first message including a hyperlink to a location of a first document; correlating sequences of words, in the first message, with a second set of behavior signals in Block S172; accessing a first set of document tags associated with the first document in Block S132; retrieving a first data access policy, in Block S132: associated with a first document tag in the first set of document tags; and including a first threshold at which access to a document associated with the first document tag is restricted; and, in response to detecting a difference between the second set of behavioral signals and the first behavioral model exceeding the first threshold, restricting access, by the first recipient account, to the first document in the first message in Block S140.

1.5 User Behavior in Message Including New Document

As shown in FIGS. 1, 3A, 3B, and 4, yet another variation of the method S100 includes, during a first time period: accessing a first corpus of messages sent from a first user account in Block S160; correlating sequences of words, in messages of the first corpus of messages, with a first set of behavior signals in Block S162; aggregating the first set of behavior signals into a first behavioral model representing combinations of behavior signals, in the first set of behavior signals, characteristic of behavior in messages sent from the first user account in Block S164; and associating the first behavioral model with the first user account in Block S168.

This variation of the method S100 further includes, during a second time period succeeding the first time period: accessing a first message outbound from the first user account in Block 156, the first message including a first document as an attachment to the first message; correlating sequences of words in the first message with a second set of behavior signals in Block S172; correlating sequences of words in the first document with a first set of language signals including a sensitive information signal in Block S120; generating a first set of document tags representing the third set of language signals in Block S124; retrieving a first data access policy, in Block S136, associated with a first document tag, in the first set of document tags, representing the sensitive information signal, and including a first threshold at which access to a document associated with the first document tag is restricted; and, in response to detecting a difference between the second set of behavioral signals and the first behavioral model exceeding the first threshold, restricting access, by the first recipient account, to the first document in the first message in Block S140.

2. Applications

Generally, Blocks of the method S100 can be executed by a computer system (e.g., an outbound mail server, a messaging server, a cloud storage server, a file server, a security server, a computer network, etc.) to: correlate sequences of words in documents with language signals; generate document tags representing the language signals; and associating the document tags with the documents. The computer system can then: receive selection of a document associated with a particular document tag, retrieve a data access policy associated with the document tag and including conditions upon which access to a document associated with the document tag is permitted; and restrict access to the document when a condition is violated.

Therefore, the computer system can execute the method S100 to: automatically analyze documents and context around their distribution; represent (or "label") these documents with document tags representing language signals detected in these documents; and enforce document distribution (or "sharing") according to a data access policy defined within an organization (or other group or entity) based on language signal tags representing these documents. The computer system can thus execute Blocks of the method S100 to: implement a verifiable compliance process to prevent or mitigate unintentional sharing of sensitive information; and reduce risk of data loss from the organization.

Furthermore, Blocks of the method S100 can also be executed by the computer system to: detect behavior concepts (e.g., financial, sensitive information, action, urgency, deadline, and keyword language signals, syntax, spelling, attachments, subjects or topics) in a corpus of messages previously sent by a user; develop a behavioral model that represents combinations of behavior concepts detected in these messages previously sent by the user; intercept a message, including a document associated with a document tag requiring access permission, outbound from the user's messaging account; detect a set of behavior signals from the message; and characterize differences between the message and past messages sent by the user based on these behavior signals and combinations of behavior signals represented in the behavior model. The computer system can then selectively: quarantine the message and revoke access permission to the document tag from the user if the difference exceeds a first threshold; release the message to its designated recipient account if the difference falls below the first threshold; and generate a notification to an administrator if the difference exceeds a second threshold.

Therefore, the computer system can execute the method S100 to: develop a behavioral model that (uniquely) describes combinations of behavior signals common in messages sent by the user; implement this behavioral model to detect messages, outbound from the user's messaging account, that contain behavior signals that deviate from combinations of behavior signals represented in the behavioral model; quarantine these messages accordingly; and restrict further access, by the user, to documents containing sensitive information. The computer system can thus execute the Blocks of the method S100 to automatically detect and quarantine malicious messages outbound from the user's messaging account, such as if the user is intentionally attempting to send sensitive information to unauthorized recipient accounts.

For example, an email drafted by a particular user and sent from the particular user's email account to a recipient account may contain an attachment of a large corpus of documents containing sensitive information. The computer system can thus: access document tags associated with the corpus of documents; detect presence (or absence) of a workflow around the corpus of documents; retrieve appropriate data access policies governing the documents based on presence (or absence) of a detected workflow; and selectively permit or restrict recipient account access to the corpus of documents based on the data access policies. Therefore, the computer system can dynamically permit or restrict access to documents based on a context (e.g., a specific combination of the corpus of documents, the recipient account of the email, a time at which the email is sent) in which the documents are shared.

Furthermore, in this example, the computer system can: train a behavior model with emails previously sent from the user's account and/or emails previously sent from accounts of other users of a group in which the user is a member; and detect a difference between behavior concepts in the new email and corresponding characteristics of emails previously sent from the user's account and/or the other user's accounts, such as a difference between the number of documents contained in the new email and the number of documents typically contained in previously sent emails. If the difference is below a threshold, representing nominal behavior, the computer system can release the email and permit access to the corpus of documents attached to the email. Conversely, if the difference exceeds the threshold, representing abnormal behavior, the computer system can: quarantine the email; generate a notification to an administrator; and/or revoke the access from the user's account to the corpus of documents and/or documents of similar type.

The method S100 is described herein as executed by the computer system to ingest documents; detect language signals in the documents; and generate document tags. However, the computer system can additionally or alternatively execute similar methods and techniques to ingest, tag, and govern SMS messages, MMS messages, messages within a workplace communication tool, audio files, video files, etc. accordingly.

3. Document Ingestion

Blocks S110, S120, S124, and S126 of the method S100 recite: accessing a corpus of documents; for each document in the corpus of documents correlating sequences of words, in a respective document, with a respective set of language signals; generating a respective set of document tags representing the respective set of language signals; and associating the respective set of document tags with the respective document.

Generally, in Block S110, the computer system accesses or ingests a corpus of documents stored in a data repository. In one example, the computer system can access a corpus of documents stored in a cloud storage server associated with an organization. In another example, the computer system can access a corpus of documents stored in local storage of an endpoint device associated with a user within an organization.

The computer system can access or ingest any type of document, such as an electronic file such as a word processing document, spreadsheet, portable document format document, email message, instant message, SMS message, MMS message, audio file, video file, or any other file containing written, audiovisual, or other data associated with an organization. The computer system can also access or ingest a file structure, file directory, or file subdirectory that includes or contains a set of other documents, (e.g., a file within which a set of spreadsheets is stored).

In one implementation, in Block S110, the computer system accesses or ingests a document through an application programming interface (API), interfacing the computer system with an organizational data repository, which can be located locally on the premises of the organization or hosted remotely on a cloud-based platform. In one variation, the computer system accesses or ingests a document through an application programming interface (API) interfacing the computer system with an endpoint (e.g., laptop computer, desktop computer, mobile phone, etc.) of a user within the organization.

In operation, the computer system can: receive permission to access the document through the API; ingest the document; and store the document, data associated with the document (e.g., a set of document tags), and/or analyzed characteristics of the document (e.g., a set of language signals detected in the document, metadata corresponding to the set of language signals detected, a set of related language signals) to a data storage component of the computer system. Furthermore, the computer system can access or ingest a set of documents associated with the organization, such as: all available documents, all known sensitive documents, all documents with a particular online drive or database, and/or all available documents of a particular file type.

In one variation, in Block S110, the computer system can access or ingest a document in response to detecting that the document has been modified. For example, the computer system can, in response to detecting a document, with which a set of document tags has previously been associated, has been modified, access or ingest the modified document to generate a new set of document tags and associate the new set of document tags with the modified document.

In another variation, in Block S110, the computer system can access or ingest a document in response to receiving selection of the document. In particular, the computer system can access or ingest a document for which there is an absence of a previously generated and associated set of document tags. In one example, the computer system can access or ingest a document in response to receiving selection of the document as an attachment to a message. In another example, the computer system can access or ingest a document in response to receiving selection of the document through an interface for sharing the document.

In yet another variation, the computer system can access or ingest a document in response to receiving selection of a document as a hyperlink to a location of the document in a message. For example, the computer system can: detect presence of a hyperlink to a location of the document within a body of the message; and access or ingest a document in response to detecting the hyperlink. In this example, the computer system can further receive permission to access the document stored in a data repository (e.g., local storage in a user endpoint, data repository located locally on the premises of the organization, data repository hosted on a cloud-based platform, etc.).

3.1 Document Ingestion: Language Signals

Block S120 of the method S100 recites correlating sequences of words in a document with a set of language signals.

Generally, in Block S120, the computer system can implement language models, such as natural language processing models or natural language understanding models tuned to particular language concepts, to detect words, numbers, phrases, syntax, diction, and/or markings in a document that represent critical language concepts (e.g., keywords, keyphrases, financial terms, trade secret proprietary information, potential legal liabilities, human resources matters, personal health information, personally identifiable information, etc.) in each document in the corpus of documents.

The computer system can be tuned to detect concepts in a trained, semi-trained, or untrained language model. For example, the computer system can be tuned to detect a set of language signals in a trained language model by ingesting a set of training files upon which the computer system can detect a baseline set of language signals against which the document will be evaluated in Block S120. Alternatively, the computer system can be tuned to detect a set of language signals in a semi-trained language model by ingesting a combination of training files and documents from the organization to generate the baseline set of language signals. In another example implementation, the computer system can ingest a document in Block S110 without any training and employ unsupervised techniques to detect the set of language signals concurrently or approximately concurrently with ingestion of the document in Block S120.

Additionally or alternatively, the computer system can implement natural language processing techniques to detect syntax (grammar, punctuation, spelling, formatting) characteristics of each document.

3.1.1 Financial Signal

In one implementation, the computer system accesses a document in the corpus of documents and implements a financial signal model to detect words and phrases related to financial concepts in the document, such as: PCI, PHI, PII, and/or other types of sensitive data. For example, the computer system can implement a natural language processing model trained on a financial services and financial transaction lexicon (hereinafter a "financial signal model") to detect words and phrases related to financial transactions in the document, such as: "bank" or "financial institution"; "merger," "acquisition," or "M&A"; "direct deposit"; and "deal" or "terms."

Accordingly, the computer system can generate a set of financial signals that represent the types and/or frequencies of such finance-related words and phrases detected in the document (e.g., per paragraph within the document, per page within the document, in total within the document). For example, for each word or phrase detected in the document by the financial signal model, the computer system can: normalize the word or phrase; and generate one financial signal containing the normalized language value. In this example, the computer system can: normalize "bank" to "financial institution"; normalize "merger," "acquisition," or "acquire" to "M&A"; and store these normalized values as discrete financial signals for this document.

In another example, the computer system can generate one financial signal representing the presence (or absence) of all finance-related words and phrases detected in the document. In this example, the computer system can also derive additional signals from these finance-related words and phrases detected in the document, such as: a frequency of finance-related words and phrases detected in the document or a ratio of finance-related words and phrases to other words counted in the document.

However, the computer system can implement any other method or technique to detect and represent finance-related concepts, present in the document, in a set of financial signals.

Similarly, the computer system can implement natural language processing models each trained on a respective lexicon of another field (e.g., healthcare, human resources, law, etc.) to detect words and phrases in the document related to that field. The computer system can then generate a set of language signals accordingly.

3.1.2 Sensitive Information Signal

Similarly, the computer system can implement a sensitive information model to detect words and phrases related to sensitive information in the document, such as: a username and password; bank account information (e.g., by detecting a sequence of numerical characters similar to a bank account or bank routing number); or a Social Security number. For example, the computer system can implement a natural language processing model trained on a sensitive information lexicon (hereinafter a "sensitive information model") to detect words and phrases representing sensitive information in the document.

Accordingly, the computer system can generate a sensitive information signal that represents the types and/or frequencies (e.g., per paragraph within the document, per page within the document, in total within the document) of such sensitive words and phrases detected in the document. For example, for each word or phrase detected in the document by the sensitive information model, the computer system can: normalize the word or phrase; and generate one sensitive information signal containing the normalized language value. In this example, the computer system can: normalize "SSN" to "Social Security Number"; normalize "handle" to "username"; normalize "passcode" to "password"; normalize "ACCT" to "account number"; and store these normalized values in discrete sensitive information signals for this document.

In another example, the computer system generates one sensitive information signal representing presence (or absence) of sensitive words and phrases detected in the document. In this example, the computer system can also derive and store a frequency of sensitive information detected in the document or representing a ratio of sensitive information to other words counted in the document, etc.

However, the computer system can implement any other method or technique to detect and represent sensitive concepts, present in the document, in a set of sensitive information signals.

3.1.3 Action Signal

Similarly, the computer system can implement an action signal model to detect words and phrases related to action requests in the document, such as: "Can the change be effective"; "Can you make this change"; "Let me know when you have made this change"; "Buy this stock;" or "Short this stock." For example, the computer system can implement a natural language processing model trained on an action request and prompt lexicon (hereinafter a "action signal model") to detect words and phrases related to action requests in the document.

Accordingly, the computer system can generate an action signal that represents the types and/or frequencies (e.g., per paragraph within the document, per page within the document, in total within the document) of such action-related words and phrases in the document. For example, for each word or phrase detected in the document by the action signal model, the computer system can: normalize the word or phrase; and generate one action signal containing the normalized language value. In this example, the computer system can: normalize "Can the change be effective," "Can you make this change," "Let me know when you have made this change," etc. to "make a change"; and store these normalized values in discrete action signals for this document.

In another example, the computer system generates one action signal representing presence (or absence) of action requests detected in the document. The computer system can also derive and store a frequency of action requests detected in the document or representing a ratio of action requests to other words counted in the document, etc.

However, the computer system can implement any other method or technique to detect and represent action-related concepts—present in the email—in a set of action signals.

3.1.4 Urgency Signal

Similarly, the computer system can implement an urgency signal model to detect words and phrases related to urgency of an action request in the document, such as: "I need"; "right now"; or "We need this today." For example, the computer system can implement a natural language processing model trained on an urgency and social pressure lexicon (hereinafter an "urgency signal model") to detect words and phrases related to urgency in the document.

Accordingly, the computer system can generate an urgency signal that represents the types and/or frequencies (e.g., per paragraph within the document, per page within the document, in total within the document) of such urgency-related words and phrases in the document. For example, for each word or phrase detected in the document by the urgency signal model, the computer system can normalize the word or phrase (e.g., by normalizing "I need," "right now," and "We need this today" to "urgent"); and generate one urgency signal containing this normalized language value.

In another example, the computer system generates one urgency signal representing presence (or absence) of urgency-related words and phrases detected in the document. The computer system can also derive and store: a frequency of urgency-related words and phrases detected in the document; a ratio of urgency-related words and phrases to other words counted in the document; etc.

However, the computer system can implement any other method or technique to detect and represent urgency-related concepts, present in the document, in a set of urgency signals.

3.1.5 Deadline Signal

The computer system can additionally or alternatively implement a deadline signal model to detect words and phrases indicating a deadline of an action request in the document, such as: "within the next two hours"; "within two days"; "end of day"; "EOD"; "end of week"; or "next pay date." For example, the computer system can implement a natural language processing model trained on a deadline and time lexicon (hereinafter a "deadline signal model") to detect words and phrases related to deadlines in the document.

Accordingly, the computer system can generate a deadline signal that represents the types and/or frequencies (e.g., per paragraph within the document, per page within the document, in total within the document) of such deadline-related words and phrases in the document. For example, for each word or phrase detected in the document by the deadline signal model, the computer system can: normalize the word or phrase (e.g., by normalizing "within the next two hours" and "end of day" to "deadline pending"); and generate one deadline signal containing the normalized language value.

In another example, the computer system can generate one deadline signal representing presence (or absence) of deadline-related words and phrases detected in the document. The computer system can also derive and store: a frequency of deadline-related words and phrases detected in the document; a ratio of deadline-related words and phrases to other words counted in the document; etc.

However, the computer system can implement any other method or technique to detect and represent deadline-related concepts, present in the document, in a set of deadline signals.

3.1.6 Keyword Signal

The computer system can additionally or alternatively implement a keyword signal model to detect words and phrases in the document that are analogous (i.e., similar or identical) to stored keywords or keyphrases, such as: an internal project name specified by the organization; "confidential"; "NDA"; and "invoice."

Accordingly, the computer system can generate a keyword signal that represents the types and/or frequencies (e.g., per paragraph within the document, per page within the document, in total within the document) of such keywords and keyphrases detected in the document.

However, the computer system can implement any other method or technique to detect and represent keywords and keyphrases, present in the document, in a set of keyword signals.

3.1.7 Syntax, Grammar, Spelling

In one variation, the computer system further implements syntax analysis techniques to detect grammar, punctuation, spelling, and/or formatting in the document. For example, the computer system can implement spell-check, grammar-check, and other syntax analysis techniques to detect and characterize presence and distribution of: commas; periods; colons; semi-colons; bullets and numbering; spelling and grammatical errors; and/or salutations; etc. in the document.

The computer system can additionally or alternatively characterize linguistic complexity of the document, such as by implementing syntax analysis techniques to calculate scores for: syntagmatic complexity (e.g., based on word length); paradigmatic complexity (e.g., based on variety of grammatical categories); organizational complexity (e.g., based on variety of component arrangement, phonotactic restrictions, and word order); and/or hierarchic complexity (e.g., based on recursion and lexical-semantic hierarchies) of language contained in the body of the document.

In this variation, the computer system can store quantitative values for presence of various syntactical features (e.g., punctuating, errors) in the document and scores for linguistic complexity of the document. Additionally or alternatively, the computer system can generate a sparse representation (or "fingerprint") of punctuation and formatting, etc. in the document.

However, the computer system can detect and store representations of any other syntactical features of the document in any other way.

3.2 Document Ingestion: Document Metadata

The computer system can then aggregate these language signals (e.g., all financial, action, urgency, deadline, keyword signals, syntax signals, etc.) extracted from the document and generate metadata corresponding to the language signals.

In one implementation, the computer system can generate a statistical representation (e.g., histogram, chart, graph, etc.) representing frequencies at which the set of language signals are detected throughout the document.

In another implementation, the computer system can generate statistical information (e.g., signal) representing the set of language signals ordered according to a most frequently detected language signal within a document to a least frequently detected language signal in the document.

The computer system can also generate any other metadata corresponding to the set of language signals detected in the document.

The computer system can store metadata corresponding to language signals detected in each document in a document metadata database associated with the document.

3.2 Document Ingestion: Related Language Signals

Block S122 of the method S100 recites identifying a set of related language signals based on a hierarchy defining a set of relationships between the set of language signals and the set of related language signals.

Generally, the computer system can implement a knowledge base (e.g., entity hierarchy) defining relationships between each language signal and respective related language signals. In one implementation, the computer system can implement an entity hierarchy defining a set of relationships between a set of language signals detected in a document and a respective set of related language signals.

In one implementation, in Block S122, the computer system identifies a set of related language signals based on: an entity hierarchy; and a set of language signals detected in a document. For example, the computer system can identify the language signal "Project Orion" is a related language signal of the language signal "Project Atlantis" based on an entity hierarchy defining a relationship between "Project Orion" and "Project Atlantis" (e.g., "Project Orion" is a derivative of "Project Atlantis"). Additionally or alternatively, the computer system can identify the language signal "confidential" as a related language signal of "Project Atlantis" based on the entity hierarchy defining a relationship between "confidential" and "Project Atlantis" (e.g., "Project Atlantis" has been predefined as a confidential project in the organization). Therefore, the computer system can identify "Project Orion" and/or "confidential" as related to the document despite an absence of the phrases "Project Orion" and "confidential" in the document.

In another example, the computer system can identify the language signal "finance" is a related language signal of the language signal "direct deposit" based on the entity hierarchy defining a relationship between "finance" and "direct deposit" (e.g., "direct deposit" is a finance-related term). Therefore, the computer system can identify "finance" as related to the document despite an absence of the word "finance" in the document.

In one variation, the computer system identifies a set of related language signals based on the entity hierarchy and a subset of the set of language signals detected in the document. For example, the computer system can utilize statistical information, such as a signal representing the set of language signals ordered according to a most frequently detected language signal within a document to a least frequently detected language signal in the document to: identify a subset of language signals corresponding to a predefined number (e.g., three, five, ten) of most frequently detected language signals; and identify a set of related language signals based on an entity hierarchy defining a set of relationships between the subset of language signals and the set of related language signals. Therefore, the computer system can identify related language signals most relevant to the document.

3.4 Document Ingestion: Automatic Tagging

Blocks S124 of the method S100 recite: generating a set of document tags representing the set of language signals; and associating the set of document tags with the document.

Generally, in Block S124, the computer system can generate a set of document tags based on the set of language signals detected in a document, the metadata (e.g., statistical information, histogram, etc.) about the set of language signals detected in the document, the set of related language signals in the document, and/or any other basis.

In one implementation, the computer system generates a set of document tags representing the set of language signals detected in a document. For example, the computer system can generate a respective document tag for each language signal in the set of language signals. In another example, the computer system can select a subset of language signals from the set of language signals, and then the computer system can generate a respective document tag corresponding to each language signal in the subset of language signals.

In one implementation, the computer system generates a document tag including a name of a language signal (of the set of language signals) of which the document tag represents. For example, the computer system can generate a document tag including "Project Atlantis" corresponding to a "Project Atlantis" language signal detected in a document. Additionally or alternatively, the computer system can generate the document tag including any other information.

The computer system can then associate the set of document tags with a document in Block S126. In one implementation, the computer system modifies the document embedding the set of document tags as metadata in the document. In one example, the computer system can: generate a new document implementing (e.g., embedding) the set of document tags as metadata included in the document; and store the new document in a data repository (e.g., a data repository including the corpus of documents). In another example, the computer system can implement (e.g., embed) the set of document tags as metadata in a document stored in a data repository through an API interfacing the computer system and the data repository. In yet another example, the computer system can store, in a data repository: the set of document tags; and an association (e.g., link, mapping, etc.) between the set of document tags and the document. However, the computer system can implement any other method or technique to associate the set of document tags with a document.

3.4.1 Automatic Tagging Based on Metadata

In one variation, in Block S124, the computer system generates a set of document tags corresponding to a predefined number of most frequently detected language signals of the set of language signals. For example, the computer system can utilize statistical information, such as a signal representing the set of language signals ordered according to a most frequently detected language signal within a document to a least frequently detected language signal in the document to: identify a subset of language signals corresponding to a predefined number (e.g., three, five, ten) of most frequently detected language signals; and generate a set of document tags corresponding to the subset of language signals. In particular, the computer system can generate a set of document tags, including "Project Atlantis," "M&A," and "terms," in response to identifying "Project Atlantis" as a most frequently detected language signal in a document, "M&A" as a second most frequently detected language signal in the document, and "terms" as a third most frequently detected language signal.

In another variation, in Block S124, the computer system generates a set of document tags based on a histogram representing the set of language signals. In another example, the computer system can: identify a pattern corresponding to a histogram representing frequencies at which language signals in the set of language signals are detected throughout a document; and generate a set of document tags corresponding to the pattern.

The computer system can generate a set of document tags based on any other statistical information and/or metadata corresponding to the set of language signals.

3.4.2 Automatic Tagging Based on Related Language Signals

In one implementation, in Block S124, the computer system further generates the set of document tags based on a set of language signals and a set of related language signals, such as a set of related language signals identified based on an entity hierarchy defining a set of relationships between a set of language signals and the set of related language signals. For example, the computer system can generate a set of document tags, including "Project Atlantis," "Project Orion," and "confidential," in response to identifying "Project Orion" and "confidential" as related language signals of "Project Atlantis."

In one variation, in Block S124, the computer system can generate the set of document tags based on: statistical information corresponding to the respective set of language signals; and the set of related language signals. For example, the computer system can utilize statistical information, such as a signal representing the set of language signals ordered according to a most frequently detected language signal within a document to a least frequently detected language signal in the document to: identify a subset of language signals corresponding to a predefined number (e.g., three, five, ten) of most frequently detected language signals; identify a set of related language signals based on an entity hierarchy defining a set of relationships between the subset of language signals and the set of related language signals; and generate a set of document tags corresponding to the subset of language signals and the set of related language signals.

The computer system can generate a set of document tags based on any other combination of: statistical information and/or metadata corresponding to the set of language signals; and the set of related language signals.

4. Data Access Control

Blocks S130, S132, S136, S138, and S140 of the method S100 recite: receiving selection of a first document in the corpus of documents; accessing a first set of document tags associated with the first document; retrieving a first set of data access policies associated with the first set of document tags, the first set of data access policies including a first data access policy: associated with a first document tag in the first set of document tags; and including a first set of identity characteristics of a user account permitted to access a document associated with the first document tag; receiving selection of a first recipient account of the first document; retrieving a second set of identity characteristics associated with the first recipient account; and, in response to detecting the first set of identity characteristics excluding the second set of identity characteristics, restricting access to the first document by the first recipient account.

4.1 Data Access Control: Document Selection

Generally, in Block S130, the computer system receives selection of a document.

In one implementation, the computer system receives selection of a document as an attachment to a message. For example, the computer system can receive selection of a document through an interface to include the document as an attachment to a message (e.g., email message, instant message, SMS message, MMS message). In another example, the computer system can detect presence of the document as an attachment to the message as selection of the document, such as in an outbound message or in a draft message draft.

In one variation, the computer system receives selection of a document as a hyperlink to a location of a document in a body of a message. For example, the computer system can detect presence of a hyperlink to a location of the document within a body of the message as selection of the document, such as in an outbound message or in a draft message.

In another variation, the computer system receives selection of a document through an interface for sharing the document. For example, the computer system can detect selection of a sharing icon, corresponding to the document, on a graphical user interface of a cloud-based data storage platform.

However, the computer system can implement any other method or technique to receive selection of a document.

4.2 Data Access Control: Document Tag Retrieval

Generally, in Block S132, the computer system accesses a set of document tags associated with a document.

In one implementation, in Block S132, the computer system accesses the set of document tags embedded in a document. In one example, the computer system can, in response to receiving selection of a document: access the document; detect a set of document tags embedded in the document; and access the set of document tags. In another example, the computer system can, in response to receiving selection of a document: detect an association between the document and a set of document tags (e.g., stored externally from the document); and access the set of document tags.

In one variation, in response to receiving selection of a document, and in response to detecting an absence of a set of document tags associated with the document, the computer system can execute Blocks S110, S120, S124, and S126 of the method S100 to: access the document; correlate sequences of words in the document with a set of language signals; generate a set of document tags; and associate the set of document tags with the document, as described above.

4.3 Data Access Control: Data Access Policies and Enforcement

Generally, in Block S136, the computer system retrieves a set of data access policies associated with a set of document tags. For example, the computer system can retrieve a set of data access policies associated with the set of document tags accessed in Block S132. The computer system can retrieve the set of data access policies from a repository storing data access policies associated with document tags.

In one implementation, the computer system associates zero or more data access policies with each document tag. The computer system can, for each document tag in a set of document tags, retrieve data access policies associated with a respective document tag. Furthermore, the computer system can implement each data access policy to include a rule defining an action(s) and a set of conditions upon which to take the action(s) (or to not take the action(s)). The computer system can then execute the action(s) based on the set of conditions.

Generally, in Blocks S142 and S140, the computer system can permit or restrict access to a document based on a set of conditions. In one implementation, the computer system can retrieve a first data access policy in Block S136: associated with a first document tag; and including a set of conditions upon which access to a document associated with the first document tag is permitted. The computer system can then, in response to detecting the set of conditions are met, permit access to the document associated with the first document tag in Block S142 in accordance with the first data access policy. Alternatively, in response to detecting violation of one or more conditions of the set of conditions, the computer system can restrict access to the document associated with the first document tag in Block S140 in accordance with the first data access policy. In one variation, the computer system can permit or restrict access to a document associated with the first document tag based on detecting any combination of the set of conditions.

In one implementation, in Block S142, the computer system permitting access to a document can include permitting selection of the document. In one example, the computer system can: permit selection of the document as an attachment to a message by a user (e.g., sender of the message); and/or permit inclusion of a hyperlink to a location of the document in a body of the message by the user. In another example, the computer system can permit the document to be selected in an interface for sharing the document by a user.

In one variation, in Block S142, the computer system permitting access to a document can include permitting selection of a recipient account of a message providing access to the document. In one example, the computer system can: permit selection of the recipient account of the message including the document as an attachment to a message; and/or permit selection of the recipient account including a hyperlink to a location of the document in a body of the message. In another example, the computer system can permit selection of the recipient account in an interface for sharing the document.

In another variation, in Block S142, the computer system permitting access to a document can including permitting transmission of a message (e.g., email message, instant message, SMS message, MMS message) providing access to the document. For example, the computer system can: permit transmission of a message including the document as an attachment to the message; and/or permit transmission of a message including a hyperlink to a location of the document in a body of the message.

In yet another variation, in Block S142, the computer system permitting access to a document can including permitting access to open, view, and/or edit the document by a sender account and/or a recipient account of the message. In one example, the computer system can permit access, by a sender account of a message, to open, view, and/or edit a document: included as an attachment to the message; and/or referred to by a hyperlink to a location thereof in a body of the message. Similarly, the computer system can permit access to the document by a recipient account of the message, such as to open, view, and/or edit the document: included as an attachment to the message; and/or referred to by a hyperlink to a location thereof in a body of the message.

However, the computer system can implement any other method or technique to permit access to a document.

In one implementation, in Block S140, the computer system restricting access to a document can include restricting selection of the document. In one example, the computer system can: restrict selection of the document as an attachment to a message; and/or restrict inclusion of a hyperlink to a location of the document in a body of the message. In another example, the computer system can restrict the document to be selected in an interface for sharing the document.

In one variation, in Block S140, the computer system restricting access to a document can include restricting selection of a recipient account of a message providing access to the document. In one example, the computer system can: restrict selection of the recipient account of the message including the document as an attachment to a message; and/or restrict selection of the recipient account of a message including a hyperlink to a location of the document in a body of the message. In another example, the computer system can restrict selection of the recipient account in an interface for sharing the document.

In another variation, in Block S140, the computer system restricting access to a document can including restricting transmission of a message (e.g., email message, instant message, SMS message, MMS message) providing access to the document. For example, the computer system can: restrict transmission of a message including the document as an attachment to the message; and/or restrict transmission of a message including a hyperlink to a location of the document in a body of the message. In particular, the computer system can: block transmission of the message, quarantine the message for further inspection, and/or execute any other suitable action to restrict transmission of the message.

In yet another variation, in Block S140, the computer system restricting access to a document can including restricting access to open, view, and/or edit the document by a sender and/or a recipient account of the message. In one example, the computer system can restrict access to the document by a sender of the message, such as to open, view, and/or edit the document: included as an attachment to the message; and/or referred to by a hyperlink to a location thereof in a body of the message. Similarly, the computer system can restrict access, by a recipient account of a message, to open, view, and/or edit a document: included as an attachment to the message; and/or referred to by a hyperlink to a location thereof in a body of the message.

Additionally, in Block S140, the computer system can generate a prompt to a device associated with a user (e.g., sender of the message) indicating access to the document is restricted. For example, the computer system can generate a prompt including "the selected recipient is not permitted access to the selected document."

However, the computer system can implement any other method or technique to restrict access to a document.

4.3.1 Conditional Access Based on Identity

In one variation, in Blocks S136, S134, S140, the computer system can: retrieve a first set of data access policies associated with the first set of document tags, the first set of data access policies including a first data access policy, associated with a first document tag in the first set of document tags, and including a first set of identities permitted to access a document associated with the first document tag; receive selection of a recipient account of the first document; and, in response to detecting the set of identities excluding the recipient account, restrict access to a document by the recipient account. Alternatively, in Block S142, the computer system can, in response to detecting the set of identities including the recipient account, permit access to the document by the recipient account.

The computer system can receive selection of a recipient account of a document in Block S134. In one example, the computer system can receive selection of the recipient account as an input of an email address or messaging identifier. In another example, the computer system can detect a recipient account (e.g., email address, messaging identifier) of an outbound message including the document as the selection of the recipient account of the document.

In one implementation, the computer system can implement a data access policy defining a set of identities permitted to access a document associated with a particular document tag. For example, an identity can include a user account, email account, messaging account, single sign on account, and any other identifier to uniquely identify a user.

In one implementation, the computer system can implement a data access policy defining a set of identities permitted to access a document associated with a particular document tag representing (or related to) a sensitive information signal. In one variation, the computer system can implement a data access policy defining a set of identities permitted to access a document associated with a particular document tag representing (or related to) a keyword signal, such as a "confidential" keyword signal. Therefore, the computer system can protect such language signals from unauthorized view or modification.

Additionally or alternatively, the computer system can implement a data access policy defining a set of identities permitted to access a document associated with a particular document tag representing (or related to) any type of language signal.

In one implementation, the computer system can implement a data access policy including a rule requiring encryption of an outbound message including a document, associated with a document tag, as an attachment to the outbound message. The computer system can then, in response to detecting the first set of identities including the second recipient account: encrypt an outbound message to the second recipient account, including the first document as an attachment to the outbound message in Block S144; and permit transmission of the outbound message in Block S146. For example, the computer system can implement such a data access policy, requiring message encryption, associated with a document tag representing (or related to) a sensitive information signal and/or any other type of language signal as described above. The computer system can implement similar techniques to implement and enforce a data access policy including a rule requiring encryption of an outbound message including a hyperlink to a location of a document associated with a document tag.

4.3.2 Conditional Access Based on Identity Characteristic

Similarly, in another variation, in Blocks S136, S134, S138, S140, the computer system can: retrieve a first set of data access policies associated with the first set of document tags, the first set of data access policies including a first data access policy: associated with a first document tag in the first set of document tags and including a first set of identity characteristics of a user account permitted to access a document associated with the first document tag; receive selection of a first recipient account of the first document; retrieve a second set of identity characteristics associated with the first recipient account; and, in response to detecting the first set of identity characteristics excluding the second set of identity characteristics, restrict access to the first document by the first recipient account. The computer system can also, in response to detecting an intersection between the second set of identity characteristics and the first set of identity characteristics, permit access to the first document by the first recipient account in Block S142.

Generally, the computer system can retrieve a data access policy including a first set of identity characteristics of a user account permitted to access a document. For example, an identity characteristic of a user account can include: a job title or position of the user (e.g., executive, director, manager, staff, intern, accountant, engineer, attorney); an organization employing the user; a department, within an organization, employing the user (e.g., finance, merger and acquisition (M&A), legal, technology, human resources, security); an office location within an organization; a committee or team in which the user is a member for a particular project; and/or any other identity characteristic.

In one implementation, in Block S138, the computer system can retrieve a set of identity characteristics associated with a selected recipient account, such as from a repository storing sets of identity characteristics of user accounts. In one example, the computer system can retrieve the set of identity characteristics from an organizational chart and/or other organizational information.

In one example of this variation, in response to receiving selection of a recipient account of a document, the computer system can retrieve a second set of identity characteristics associated with the recipient account in Block S138. The computer system can then, in response to detecting the first set of identity characteristics excluding the second set of identity characteristics (e.g., there is an absence of identity characteristics associated with the recipient account included in the first set of identity characteristics of a user account permitted access to the document associated with the third document tag, there is an absence of identity characteristics associated with the recipient account), restrict access to the document by the recipient account in Block S140 in accordance with the data access policy. Alternatively, in response to detecting an intersection between the first set of identity characteristics and the second set of identity characteristics (e.g., one or more identity characteristics associated with the second recipient account is included in the first set of identity characteristics of a user account permitted access to the document), the computer system can permit access to the document in Block S142 in accordance with the data access policy.

In one implementation, the computer system can implement a data access policy defining a set of identity characteristics of a user account permitted to access a document associated with a particular document tag representing (or related to) a sensitive information signal. In one variation, the computer system can implement a data access policy defining a set of identity characteristics of a user account permitted to access a document associated with a particular document tag representing (or related to) a keyword signal, such as a "confidential" keyword signal. Therefore, the computer system can protect such language signals from unauthorized view or modification.

Additionally or alternatively, the computer system can implement a data access policy defining a set of identity characteristics of a user account permitted to access a document associated with a particular document tag representing (or related to) any type of language signal.

In one implementation, the computer system can implement a data access policy including a rule requiring encryption of an outbound message including a document, associated with a document tag, as an attachment the outbound message. The computer system can then, in response to detecting an intersection between a set of identity characteristics of a recipient account of an outbound message and a set of identity characteristics of a user account permitted access to a document associated with the document tag: encrypt the outbound message to the recipient account, including the first document as an attachment to the outbound message in Block S144; and permit transmission of the outbound message in S146. For example, the computer system can implement such a data access policy, requiring message encryption, associated with a document tag representing (or related to) a sensitive information signal and/or any other type of language signal as described above. The computer system can implement similar techniques to implement and enforce a data access policy including a rule requiring encryption of an outbound message including a hyperlink to a location of a document associated with a document tag.

4.3.3 Conditional Access Based on Time

Generally, the computer system can permit (or restrict) access to a document based on any characteristic, such as a time characteristic, hardware characteristic, software characteristic, network characteristic, location characteristic, and/or any other characteristic or combination of characteristics.

In one implementation, the computer system can retrieve a data access policy associated with a document tag, the data access policy including: a set of identities permitted to access to a document associated with the document tag; and a time period (e.g., prior to a predefined date) in which access to the document is limited to the set of identities (i.e., only the set of identities are permitted to access a document associated with the document tag). For example, during a first time period prior to the predefined date, in response to receiving selection of a recipient account of the document, and in response to detecting the second set of identities excluding the third recipient account, the computer system can restrict access to the document associated with the document tag by the recipient account in accordance with the fourth data access policy. However, during a second time period succeeding the predefined date, in response to receiving selection of the recipient account of the document, the computer system can permit access to the document associated with the document tag by the recipient account despite the set of identities excluding the recipient account.

The computer system can implement similar methods or techniques to retrieve and enforce a data access policy including: a set of identity characteristics of a user account permitted to access a document associated with a document tag and a time period (e.g., prior to a predefined date) in which access to the document is only permitted to user accounts exhibiting the set of identity characteristics. Additionally or alternatively, the time period can include certain times of day, days of the week, weeks of the year, etc.

However, the computer system can implement any other method or technique to: retrieve a set of data access policies associated with a set of document tags; and permit (or restrict) access to a document based on a set of conditions.

4.4 Data Access Control: Feedback

Blocks S142 and S148 of the method S100 recite: in response to restricting access to the first document by the first recipient account, and in response to receiving selection authorizing access to the first document by the first recipient account, permitting access to the first document by the first recipient account; and modifying the first data access policy adding a first identity characteristic in the second set of identity characteristics to the first set of identity characteristics.

In one implementation, the computer system can: generate a prompt indicating access to a document is restricted; and cause the prompt to be served at a device. In one example, in response to detecting a set of identities, included in a first data access policy, permitted to access a document excluding an intended recipient account of a message providing access to the document, the computer system can generate and serve a prompt indicating the intended recipient account is restricted access to the document. In another example, in response to detecting a set of identity characteristics of a user account permitted to access a document excluding a set of identity characteristics of an intended recipient account of a message providing access to the document, the computer system can generate and serve a prompt indicating the intended recipient account is restricted access to the document.

In one variation, the computer system can generate and serve a prompt: indicating the intended recipient account is restricted access to the document, including a request to proceed; and an input field(s) to accept an affirmative or negative response to the request. In response to receiving selection restricting access to the document (e.g., a negative response to the request), the computer system restricts access to the document. Alternatively, in response to receiving selection authorizing access to the document (e.g., an affirmative response to the request), the computer system permits access to the document in Block S142.

Additionally, in Block S148, in response to receiving selection authorizing access to the document (e.g., an affirmative response to the request) the computer system can modify a data access policy based on the selection. In the first above example in this subsection, in response to receiving selection authorizing access, by the intended recipient account, to the document, the computer system can modify the first data access policy, including adding the intended recipient account to the set of identities permitted to access the document. In the second above example in this subsection, in response to receiving selection authorizing access, by the intended recipient account, to the document, the computer system can modify the first data access policy, including adding an identity characteristic of the intended recipient account to the set of identity characteristics permitted to access the document. The computer system can then store the modified data access policy in a repository storing data access policies associated with document tags. Therefore, the computer system can dynamically improve the policy engine during runtime.

4.4.1 Data Access Control: Feedback Interface

Blocks S152 and S154 of the method S100 recite: in response to accessing the first document tag by a first user account included in the first set of identities, generating a prompt including a name of the first document tag; and, in response to accessing the first document tag by a second user account excluded from the first set of identities, generating a prompt including an alternate identifier of the first document tag.

Generally, the computer system can: generate and serve an interface for modifying document tags and/or data access policies; and modify document tags and/or data access policies in response to user selection. For example, the computer system can generate and serve the interface to include: a listing of document tags; a listing of data access policies associated with each document tag; information (e.g., rule(s) defining an action(s) and a set of conditions upon which to take the action(s)) corresponding to each data access policy associated with each document tag; a number of documents with which each document tag is associated, a listing of documents associated with each document tag; and/or any other information.

Generally, the computer system can implement a data access policy requiring anonymization of a document tag associated with the data access policy. For example, the data access policy can include: a set of identities permitted to access a document associated with the document tag; and a rule requiring anonymization of the document tag in response to detecting access by a user account excluded from the set of identities. In one implementation, in response to accessing the document tag by a first user account included in the set of identities, the computer system can generate a prompt (e.g., via the interface) including a name of the document tag in Block S152. Alternatively, in response to accessing the document tag by a second user account excluded from the set of identities, the computer system can generate a prompt (e.g., via the interface) including an alternate identifier (e.g., an identifier obtained from attributes associated with the document tag, a hash of the name of the document tag) corresponding to the document tag in Block S154. In one variation, the computer system can similarly generate a prompt including either a name of a document tag or an alternate identifier of a document tag based on: a set of identity characteristics of a user account permitted to access a document associated with the document tag; and a set of identity characteristics of a user account accessing the document tag. Therefore, the computer system can implement a verifiable governance and compliance process while protecting sensitive and/or confidential information.

In one implementation, the computer system can, in response to receiving a set of selections modifying a document tag and/or a data access policy: modify the document tag and/or the data access policy associated with the document tag accordingly; and store the modified document tag and/or the modified data access policy.

5. Workflow Detection

Blocks S150 and S136 of the method s100 recite: detecting a workflow based on a set of document tags; and retrieving the first set of data access policies, associated with the set of document tags, and corresponding to the workflow.

Generally, in Block S136, the computer system can selectively retrieve a data access policy associated with a document based on a detected workflow. In particular, the computer system can detect a workflow, such as in connection with a message including: a document as an attachment to the message; or including a hyperlink to a location of document in a body of the message, based on various signals indicating a context (e.g., a context of the message). For example, the signals can include signals representing: an identity or set of identity characteristics of a sender of the message; behavior of the sender (e.g., behavior signals); an identity or set of identity characteristics of a recipient account or intended recipient account of the message; content in a body of the message; an attachment(s) to the message; a set of document tags associated with a document(s) included as an attachment to the message or by reference of a hyperlink included in a body of the message; a time at which the message is created or to be sent; historical communication by the sender; historical communication to the recipient account or intended recipient account(s); and/or any other signal.

In one implementation, in Block S150, the computer system can detect a workflow based on a set of document tags. The computer system can then, in Block S136, retrieve a first set of data access policies: associated with the first set of document tags; and corresponding to the workflow.

For example, the computer system can access a set of document tags associated with a document, including "Acme Corp," "confidential," and "M&A." In this example, the computer system can then detect a workflow related to an acquisition of Acme Corp. and retrieve a set of data access policies accordingly, such as a data access policy including a set of identity characteristics of a user account permitted to access the document, legal department members of an organization, and M&A department members of the organization.

In one variation, in Block S150, the computer system can detect a workflow based on a set of document tags, representing a document, and a set of language signals in an outbound message including: the document as an attachment to the message; or including a hyperlink to a location of the document in a body of the message. In particular, in Block S172, the computer system can correlate sequences of words in a message, outbound from a first user account, with a second set of language signals, such as in a manner analogous (e.g., similar, identical) to Block S120, described above in connection with correlating sequences of words, in a document, with a set of language signals. The computer system can then, in Block S136, retrieve a first set of data access policies: associated with the first set of document tags; and corresponding to the first workflow.

5.1 Workflow Detection: Examples

In one example, the computer system can: detect a first workflow based on a first set of document tags associated with a first document, and retrieve a first set of data access policies corresponding to the first workflow. The computer system can subsequently: detect a second workflow based on the first set of document tags and a second set of document tags associated with a second document; and retrieve a second set of data access policies corresponding to the second workflow. In this example, the computer system can implement: a first data access policy associated with the first workflow that restricts access to a document by a recipient account; and a second data access policy associated with the second workflow that permits access to the document by the recipient account.

In another example, the computer system can: detect a first workflow based on a first set of document tags associated with a first document, and retrieve a first set of data access policies corresponding to the first workflow. The computer system can subsequently: detect a third workflow based on the first set of document tags, selection of a first recipient account, and selection of a second recipient account; and retrieve a third set of data access policies corresponding to the third workflow. In this example, the computer system can implement: a first data access policy associated with the first workflow that restricts access to the first document by a recipient account; and a third data access policy associated with the third workflow that permits access to the document by the recipient account.

In yet another example, the computer system can: detect a first workflow based on a first set of document tags associated with a first document; and retrieve a first set of data access policies corresponding to the first workflow. The computer system can subsequently: detect a fourth workflow based on the first set of document tags, selection of the first recipient account, and a transition from a first time period to a second time period; and retrieve a fourth set of data access policies corresponding to the fourth workflow. In this example, the computer system can implement: a first data access policy associated with the first workflow that restricts access to the first document by a recipient account; and a fourth data access policy associated with the fourth workflow that permits access to the document by the recipient account.

5.2 Workflow Detection: Template Matching

In one implementation, the computer system accesses a database of workflow templates, wherein each workflow template: represents and is labeled with a known workflow type; specifies a set of requisite signals and a set of likely signals that cooperate to form a workflow of this known workflow type; and specifies a set of data access policies corresponding to this known workflow type.

For example, the computer system (or other computing device or computer network) can generate workflow templates based on: similarities of signals detected in known workflows of similar types; and dissimilarities between these known workflows and other workflows of other types. The computer system can then: compare signals (e.g., behavior signals, signals representing: an identity or set of identity characteristics of a sender of the message; an identity or set of identity characteristics of a recipient account(s) or intended recipient account(s) of the message; content in a body of the message; an attachment(s) to the message; a set of document tags associated with a document(s) included as an attachment to the message or by reference of a hyperlink included in a body of the message; a time at which the message is created or to be sent; historical communication by the sender; historical communication to the recipient account or intended recipient account(s); etc.) detected in the message to signals specified in workflow templates in the database; and match these signals detected in the message to a set of signals specified in a particular workflow template of a particular workflow type, such as by matching type, confidence, frequency, and order of signals detected in the message to signals represented in the particular workflow template.

Accordingly, the computer system can then: read a particular set of data access policies from the particular workflow template; and retrieve a set of data access policies based on the particular set of data access policies.

6. Sender Document Access

Blocks S156, S138, S142 of the method S100 recite: accessing a first message, outbound from a first user account, including a hyperlink to a location of the first document in a body of the first message; retrieving a third set of identity characteristics associated with the first user account; and, in response to detecting an intersection between the first set of identity characteristics and the third set of identity characteristics, permitting access to the first document by the first user account.

Generally, in Blocks S142 and S140, the computer system can permit or restrict access to a document by a sender of a message as described above.

In one implementation, the computer system accesses a message outbound from a first user account in Block S160, and retrieves a set of identity characteristics of a first user account in Block S138. Then, in response to detecting an intersection between a set of identity characteristics of a user account permitted to access a document and the set of identity characteristics of the first user account, the computer system can permit access to the first document by the first user account in Block S142. Alternatively, in response to detecting the set of identity characteristics of a user account permitted to access a document excluding the set of identity characteristics of the first user account, the computer system can restrict access to the first document by the first user account and/or the recipient account in Block S140.

7. User Behavior

Generally, the computer system can detect deviations in behavior associated with messages sent from a user account. In particular, the computer system can: train a behavioral model representing combinations of behavior signals characteristic of behavior in messages sent from the user account; and, in response to detecting a difference between a set of behavioral signals in a message outbound from the user account and the behavioral model exceeding the first threshold, restricting access, by the first recipient account, to a document in the message.

7.1 User Behavior: Past Messages

Blocks S160, S162, S164, and S168 of the method S100 recite: accessing a first corpus of messages sent from a first user account; correlating sequences of words, in messages of the first corpus of messages, with a first set of behavior signals; aggregating the first set of behavior signals into a first behavioral model representing combinations of behavior signals, in the first set of behavior signals, characteristic of behavior in messages sent from the first user account; and associating the first behavioral model with the first user account.

Generally, in Block S160, the computer system accesses or ingests a corpus of messages, sent from a user account, stored in a data repository. In one example, the computer system can access a corpus of messages stored in a cloud storage server associated with a messaging service (e.g., email service, instant messaging service, SMS message service, etc.). In another example, the computer system can access a corpus of messages stored in a cloud storage server or local storage server associated with an organization. In another yet example, the computer system can access a corpus of messages stored in local storage of an endpoint device associated with a user within an organization.

The computer system can access or ingest any type of message, such as an email message, instant message, SMS message, MMS message, or any message containing written, audiovisual, or other data associated with an organization.

In one implementation, in Block S160, the computer system accesses or ingests a message through an application programming interface (API) interfacing the computer system with an organizational data repository, which can be located locally on the premises of the organization or hosted remotely on a cloud-based platform. In one variation, the computer system accesses or ingests a message through an application programming interface (API) interfacing the computer system with an endpoint (e.g., laptop computer, desktop computer, mobile phone, etc.) of a user within the organization.

In operation, the computer system can: receive permission to access the message through the API; ingest the message; and store the message, data associated with the message, and/or analyzed characteristics of the message (e.g., a set of behavior signals detected in the message) to a data storage component of the computer system. Furthermore, the computer system can access or ingest a set of messages or all messages associated with a user account. The computer system can also access or ingest messages for a set of user accounts or all user accounts associated with the organization.

In one implementation, the computer system: accesses the user account; retrieves an entire corpus of messages from a sent folder in the user account; and executes methods and techniques described below to extract behavior signals from these messages and to train the behavioral model on these sent messages.

In one variation, the computer system can further filter the corpus of sent messages to include only messages sent within a recent time period (e.g., a past year) or to include a most recent quantity of (e.g., 2,000) sent messages.

Additionally or alternatively, the computer system can: retrieve message threads containing messages sent from the user account; remove messages, message bodies, and/or message metadata, etc. corresponding to messages in these message threads, but not sent from the user account; and allocate the remaining messages for behavioral model training.

7.1.1 Behavior Signals

Block S162 of the method S100 recites correlating sequences of words, in messages of the first corpus of messages, with a first set of behavior signals.

Generally, in Block S162, the computer system can implement language models, such as natural language processing models or natural language understanding models tuned to particular language concepts, to detect words or phrases that represent critical language concepts in each message in the corpus of messages.

In one implementation, in Block S162, the computer system can scan bodies of messages, in the first corpus of messages, for the first set of behavior signals including: financial signals; sensitive information signals; action signals; urgency signals; deadline signals; keyword signals; and syntax signals. In particular, the computer system can implement various language models to detect behavior signals, such as financial signals, sensitive information signals, action signals, urgency signals, deadline signals, keyword signals, and syntax signals, in a message.

For example, the computer system can implement language models to detect a set of behavior signals, such as language signals, in messages in a manner analogous (e.g., similar, identical) to Block S120 described above in connection with detecting a set of language signals within a document.

In one implementation, the computer system can: access a first natural processing model trained on a stored set of keywords; based on the first natural processing model, detect a first sequence of words, related to a first keyword, in messages of the first corpus of messages; and represent the first sequence of words as a first keyword signal in the first set of behavior signals.

The computer system can thus implement various signal models to detect concepts in the body of the message and to generate behavior signals accordingly.

The computer system can similarly implement these signal models to detect concepts in the subject line and/or signature of a message (e.g., email message) and to generate behavior signals accordingly.

In one implementation, the computer system can detect concepts in a header of a message, and generate behavior signals accordingly. For example, the computer system can detect: an identity or set of identity characteristics of a recipient account(s) or intended recipient account(s) of the message; a time at which the message is sent; a location (e.g., IP address) from which the message is sent; and/or a device from which the message is sent. The computer system can then generate behavior signals accordingly.

In another implementation, the computer system can: detect a number of documents contained in a message as an attachment to the message; and represent the number of documents contained in a message as an attachment signal of the set of behavior signals. Additionally or alternatively, the computer system can: detect a number of hyperlinks to locations of documents in a body of a message; and represent the number of hyperlinks to locations of documents as a hyperlink signal of the set of behavior signals.

The computer system can also detect other signals characteristic of behavior of messages sent from a user account.

7.2 User Behavior: Model Generation

Blocks S164 and S168 of the method S100 recite: aggregating the first set of behavior signals into a first behavioral model representing combinations of behavior signals, in the first set of behavior signals, characteristic of behavior in messages sent from the first user account; and associating the first behavioral model with the first user account.

Generally, in Blocks S164 and S168, the computer system can compile behavior signals into a behavioral model that represents combinations of behavioral concepts representative of (e.g., common to, typical of) messages sent from the user account; and associate the behavioral model with a user account.

In one implementation, in Block S166, the computer system can: calculate a first n-dimensional vector representing average frequencies of behavior signals (e.g., financial signals, sensitive information signals, action signals, urgency signals, deadline signals, keyword signals, and syntax signals) in each message in the first corpus of messages; and associate the first n-dimensional vector with the first behavioral model.

Therefore, the computer system can generate a reference model characteristic of behavior in messages sent from the user account with which to detect deviations in behavior in new messages outbound from the user account.

7.2.2 Hybrid Behavioral Model

In one variation, in Blocks S170, S162, S164, and S168, the computer system can implement methods and techniques described above to, in response to detecting a number of messages in a first corpus of messages falling below a first threshold quantity (e.g., 200) and sent by a first user account: access a second corpus of messages sent from a group of user accounts, including the first user account, each user account in the group of user accounts exhibiting a particular identity characteristic (e.g., employee within an organization, finance department member of the organization, engineer, executive, intern); correlate sequences of words, in messages of the second corpus of messages, with a third set of behavior signals; aggregate the third set of behavior signals into the behavioral model representing combinations of behavior signals, in a combination of a first set of behavior signals associated with the first corpus of messages and the third set of behavior signals, characteristic of behavior in messages sent from the group of user accounts; and associating the behavioral model with the first user account.

Later, in response to detecting the number of messages in the first corpus of messages exceeding a second threshold quantity (e.g., 1,000), the computer system can retrain the behavior model exclusively on behavior signals from messages sent from the first user account (i.e., excluding behavior signals derived from the second corpus of messages sent from other user accounts).

7.3 User Behavior: New Outbound Message

Blocks S156, S172, and S132 of the method S100 recite: accessing a first message outbound from the first user account to a first recipient account, the outbound message including a first document as an attachment to the outbound message; correlating sequences of words, in the first message, with a second set of behavior signals; and accessing a first set of document tags associated with the first document.

Generally, in Block S156, the computer system can access or intercept a first message outbound from the first user account. For example, the computer system can intercept a new email at a SMTP or IMAP server before the email is delivered to its designated recipient account, such as before the email is delivered to a recipient account address within the same domain as the email account or before the email leaves the domain of the email account.

In one implementation, the computer system can access a first message from the first user account to a recipient account, the first message including a document as an attachment to the outbound message. In one variation, access a first message from the first user account to a recipient account, the first message including a hyperlink to a location of a document.

In one implementation, the computer system can: correlate sequences of words, in the first message, with a set of behavior signals in Block S172, such as in a manner analogous (e.g., similar, identical) to Blocks S162 described above in connection with correlating sequences of words, in message in the corpus of message, with a set of behavior signals. Similarly, the computer system can: access a set of document tags associated with the document in Block S132; and retrieve a data access policy in Block S136, as described above.

In one variation, the computer system can additionally: correlate sequences of words in the document with a set of language signals including a sensitive information signal; and generate a set of document tags representing the set of language signals, such as described above.

7.3.1 Deviation from Nominal User Behavior

Blocks S136 and S140 of the method S100 recite: retrieving a first data access policy, associated with a first document tag in the first set of document tags, and including a first threshold at which access to a document associated with the first document tag is restricted; and, in response to detecting a difference between the second set of behavioral signals and the first behavioral model exceeding the first threshold, restricting access, by the first recipient account, to the first document in the first message.

In one implementation, in Block S136, the computer system can retrieve a data access policy: associated with a document tag (e.g., document tag representing or related to a sensitive information signal); and including a first threshold (e.g., 30%) at which access to a document associated with the first document tag is restricted. In this implementation, in Block S140, the computer system can then, in response to detecting a difference between the set of behavioral signals associated with the first message and the behavioral model exceeding the first threshold, restrict access, by the recipient account, to the document in the first message. Alternatively, in response to detecting a difference between the set of behavioral signals associated with the first message and the behavioral model exceeding the first threshold, the computer system can permit access, by the recipient account, to the document in the first message in Block S142.

In another implementation, the computer system can: calculate a second n-dimensional vector representing frequencies of behavior signals (e.g., financial signals, sensitive information signals, action signals, urgency signals, deadline signals, keyword signals, and syntax signals) in the first message in Block S174; and, in response to detecting a difference between the second n-dimensional vector and the first n-dimensional vector of the behavioral model exceeding the first threshold, restrict access, by the first recipient account, to the first document in the first message in Block S140.

The computer system can permit or restrict access, by the recipient account, to the document in the first message, as described above. For example, in response to detecting the difference between the set of behavioral signals associated with the first message and the behavioral model falling below the first threshold, the computer system can: encrypt the first message to the recipient account in Block S144; and permit transmission of the first message in Block S146, as described above.

In one variation, in Block S176, the computer system can: calculate a risk score for the first message based on the difference between the set of behavioral signals associated with the first message and the behavioral model. For example, the computer system can calculate the risk score proportional to the difference between the set of behavioral signals associated with the first message and the behavioral model.

The computer system can then, in response to detecting the risk score exceeding the first threshold, restrict access, by the recipient account, to the first document in the first message in Block S140. Alternatively, in response to detecting the risk score falling below the first threshold, the computer system can permit access, by the recipient account, to the document in the first message in Block S142.

In another variation, the computer system: stores the sets of behavioral signals, derived from the corpus of sent messages, as a set of vectors; locates these vectors to an n-dimensional feature space; and stores this n-dimensional feature space as the behavioral model of the user account. In this variation, the computer system can: implement similar methods and techniques to generate a set of behavioral signals for a first message outbound from the user account; locate a target vector based on the set of behavioral signals in the n-dimensional feature space; characterize proximity of the target vector to other vectors representing nominal messages sent from the user account in the n-dimensional feature space; and calculate a risk score for the first message proportional to proximity of the target vector to these other vectors in the n-dimensional feature space. For example, the computer system can: implement k-nearest neighbor techniques to identify a particular cluster of vectors in the n-dimensional feature space nearest the target vector that represents the first message; calculate an error between the target vector and the particular cluster of vectors (e.g., based on a combination of Euclidean distances between the target vector and the vectors in the particular cluster); and calculate a risk score for the first message proportional to this error.

7.3.2 Administrator Notification

In one variation, the computer system can, in Block S136, retrieve a data access policy: associated with a document tag related to sensitive information; and including a second threshold (e.g., 15%) at which a notification to an administrator of a document associated with the document tag is generated. In this variation, in Block S178, the computer system can then, in response to detecting a difference between the set of behavioral signals associated with the first message and the behavioral model exceeding the second threshold, generate a notification, to an administrator of the document, including an indication of the first message, from the user account, including the document. For example, the computer system can generate a prompt including indications of: the message; the user account sending the message; the document; an intended recipient account(s) of the message; a time at which the message is sent; contents within a body of the message; and/or any other information. The computer system can then serve the prompt to a device of an administrator of the document and/or any other user.

7.3.3 Access Revocation

Generally, the computer system can additionally or alternatively perform other remedial actions in response to detecting a difference between the set of behavioral signals associated with the first message and the behavioral model exceeding the first threshold. In particular, in response to detecting material deviations in behavior from the user account, the computer system can generate or modify a data access policy accordingly to revoke access, by the user account, to certain documents.

In one implementation, in Block S180, in response to detecting a difference between the set of behavioral signals associated with the first message and the behavioral model exceeding the first threshold, the computer system can modify the first data access policy excluding the first recipient account from a set of identities permitted to access a document associated with a document tag.

For example, the computer system can: retrieve a data access policy including a set of identities, including the user account, permitted to access a document associated with a first document tag related to sensitive information; and, in response to detecting a difference between the set of behavioral signals associated with the first message from the user account and the behavioral model exceeding the first threshold, the computer system can modify the data access policy excluding the first recipient account from a set of identities permitted to access a document associated with the first document tag related to sensitive information.

In one variation, in Block S180, in response to detecting a difference between the set of behavioral signals associated with the first message and the behavioral model exceeding the first threshold, the computer system can: generate a new data access policy defining a set of identities, including the first user account, restricted from accessing a document associated with a document tag (e.g., a document tag representing a sensitive information signal); and associate the second data access policy with the document tag. The computer system can then restrict access, by the first user account, to a document associated with the document tag based on the second data access policy.

For example, the computer system can: retrieve a data access policy including a first set of identity characteristics of a user account permitted to access a document associated with a document tag. In this example, in response to detecting a difference between a set of behavioral signals associated with the first message and the behavioral model of a user account falling below the first threshold, and in response to detecting an intersection between the first set of identity characteristics and a second set of identity characteristic associated with the user account, the computer system can permit access, by the user account, to the document associated with a document tag. However, in response to detecting a difference between the set of behavioral signals associated with the first message from the user account, and the behavioral model exceeding the first threshold, the computer system can, in Block S180: generate a new data access policy defining a set of identities, including the user account, restricted from accessing a document associated with the document tag (e.g., a document tag representing a sensitive information signal); and associate the second data access policy with the document tag.

Furthermore, the computer system can implement the second data access policy restricting access by the user account to take precedence over the first data access policy permitting access by the user account. The computer system can subsequently restrict access, by the first user account, to the first document based on the second data access policy.

Therefore, the computer system can dynamically adjust a policy engine based on user behavior and protect against loss of sensitive information.

7.4 User Behavior: Behavioral Model Update

Blocks S182 and S168 of the method S100 recite: aggregating the second set of behavior signals into the first behavioral model representing combinations of behavior signals, in the first set of behavior signals and the second set of behavior signals, characteristic of behavior in messages sent from the first user account; and associating the first behavioral model with the first user account.

Generally, in Blocks S182 and S168, the computer system can train the behavioral model with the behavior signals associated with the first message. In particular, the computer system can: compile the behavior signals associated with the first message into the behavioral model; and associate the trained behavioral model with the user account.

In one implementation, in Block S184, the computer system can: recalculate the first n-dimensional vector of the behavioral model based on the second n-dimensional vector associated with the first message; and, in response to recalculating the first n-dimensional vector, associate the first n-dimensional vector with the behavioral model.

8. Deviation From Group Behavior

Blocks S190, S192, S194, S196, and S140 of the method S100 recite: during the first time period: accessing a second corpus of messages sent from a group of user accounts including the first user account; correlating sequences of words, in messages of the second corpus of messages, with a third set of behavior signals; aggregating the third set of behavior signals into a group behavioral model representing combinations of behavior signals, in the third set of behavior signals, characteristic of behavior in messages sent from the group of user accounts; associating the group behavioral model with the group of user accounts; and, during the second time period, in response to detecting a difference between the second set of behavioral signals and the group behavioral model exceeding the first threshold, restricting access, by the first recipient account, to the first document in the first message.

Generally, in Blocks S190, S192, S194, S196, and S140, the computer system can implement methods and techniques described above to: aggregate a corpus of messages previously sent from a group of user accounts; detect behavior signals in this corpus of messages; and generate a group behavioral model based on these behavior signals; and, in response to detecting a difference between a set of behavioral signals of a first message, including a document, from a particular user account in the group of accounts, and the group behavioral model exceeding the first threshold, restrict access, by the recipient account, to the document in the first message.

In one implementation, the computer system can aggregate the corpus of messages from a group of user accounts, each exhibiting a common identity characteristic (e.g., employee within an organization, legal department member of the organization, engineer, executive, intern).

Accordingly, the computer system can detect deviations in behavior of messages sent from a user account to a recipient account based on nominal behavior of a group of user accounts in which the user account is included.

9. Deviation From Recipient-Specific Behavior

Blocks S190, S192, S194, S196, and S140 of the method S100 recite: during the first time period: accessing a first subset of messages, of the first corpus of messages, sent from the first user account to the first recipient account; correlating sequences of words, in messages of the first subset of messages, with a third set of behavior signals; aggregating the third set of behavior signals into a second behavioral model representing combinations of behavior signals, in the first set of behavior signals, characteristic of behavior in messages sent from the first user account to the first recipient account; associating the second behavioral model with the first user account; and, during the second time period, in response to detecting a difference between the second set of behavior signals and the second behavioral model exceeding the first threshold, restricting access, by the first recipient account, to the first document in the first message.

Generally, in Blocks S190, S192, S194, S196, and S140, the computer system can implement methods and techniques described above to: aggregate a corpus of messages previously sent from a user account to a particular recipient account; detect behavior signals in this corpus of messages;

generate a recipient account-specific behavioral model based on these behavior signals; and, in response to detecting a difference between a set of behavioral signals of a first message, including a document, and the recipient account-specific behavioral model exceeding the first threshold, restricting access, by the recipient account, to the document in the first message.

Accordingly, the computer system can detect deviations in behavior of messages sent from a user account to a particular recipient account. Therefore, the computer system can avoid detecting false-positive deviations where nominal behavior in messages sent from the user account to the particular recipient account is different than nominal behavior in messages sent from the user account to all recipient accounts.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
during a first time period:
accessing a first corpus of messages sent from a first user account;
correlating sequences of words, in messages of the first corpus of messages, with a first set of behavior signals;
aggregating the first set of behavior signals into a first behavioral model representing combinations of behavior signals, in the first set of behavior signals, characteristic of behavior in messages sent from the first user account; and
associating the first behavioral model with the first user account;
during a second time period succeeding the first time period:
accessing a first message outbound from the first user account to a first recipient account, the first message comprising a first document as an attachment to the first message;
correlating sequences of words, in the first message, with a second set of behavior signals;
accessing a first set of document tags associated with the first document;
retrieving a first data access policy:
associated with a first document tag in the first set of document tags; and
comprising a first threshold at which access to a document associated with the first document tag is restricted; and
in response to detecting a difference between the second set of behavioral signals and the first behavioral model exceeding the first threshold, restricting access, by the first recipient account, to the first document in the first message; and
during a third time period succeeding the second time period:
accessing a second message outbound from the first user account to a second recipient account, the second message comprising the first document as an attachment to the second message;
correlating sequences of words, in the second message, with a third set of behavior signals;
accessing the first set of document tags associated with the first document;
retrieving the first data access policy; and
in response to detecting a difference between the third set of behavioral signals and the first behavioral model falling below the first threshold, permitting transmission of the second message to the second recipient account.

2. The method of claim 1, further comprising, during the second period:
calculating a risk score for the first message based on the difference between the second set of behavior signals and the first behavioral model;
in response to detecting the risk score exceeding the first threshold, restricting access, by the first recipient account, to the first document in the first message; and
in response to detecting the risk score falling below the first threshold, permitting access, by the first recipient account, to the first document in the first message.

3. The method of claim 1:
wherein the first data access policy further comprises a second threshold at which a notification to an administrator of a document associated with the first document tag is generated; and
further comprising, in response to detecting the difference between the second set of behavioral signals and the first behavioral model exceeding the second threshold, generating a notification, to an administrator of the first document, comprising an indication of the first message, from the first user account, comprising the first document.

4. The method of claim 1:
wherein the first data access policy further comprises a rule requiring encryption of an outbound message comprising a document, associated with the first document tag, as an attachment to the outbound message; and
further comprising, in response to detecting the difference between the second set of behavioral signals and the first behavioral model falling below the first threshold, encrypting the first message, to the first recipient account, comprising the first document as an attachment to the first message.

5. The method of claim 1, further comprising, during the second time period:
aggregating the second set of behavior signals into the first behavioral model representing combinations of behavior signals, in the first set of behavior signals and the second set of behavior signals, characteristic of behavior in messages sent from the first user account; and associating the first behavioral model with the first user account.

6. The method of claim 1, wherein accessing a first set of document tags associated with the first document comprises accessing the first document tag representing a first sensitive information signal in the first document.

7. The method of claim 1:
wherein the first data access policy further comprises a first set of identities permitted to access a document associated with the first document tag, the first set of identities comprising the first user account; and
further comprising, in response to detecting the difference between the second set of behavioral signals and the first behavioral model exceeding the first threshold, modifying the first data access policy excluding the first recipient account from the first set of identities.

8. The method of claim 1:
wherein the first data access policy comprises a first set of identity characteristics, comprising a first identity characteristic, of a user account permitted to access a document associated with the first document tag;
further comprising, during the second period:
retrieving a second set of identity characteristics, comprising the first identity characteristic, associated with the first user account;
in response to detecting the difference between the second set of behavioral signals and the first behavioral model exceeding the first threshold:
generating a second data access policy comprising a set of identities, comprising the first user account, restricted from accessing a document associated with a document tag representing a sensitive information signal; and
associating the second data access policy with the first document tag; and
in response to detecting the difference between the second set of behavioral signals and the first behavioral model falling below the first threshold, and in response to detecting an intersection between the first set of identity characteristics and the second set of identity characteristics, permitting access, by the first user account, to the first document; and
further comprising, during a fourth period succeeding the second period, restricting access, by the first user account, to the first document based on the second data access policy.

9. The method of claim 1:
wherein correlating sequences of words in messages of the first corpus of messages, with a first set of behavior signals comprises:
scanning bodies of messages, in the first corpus of messages, for the first set of behavior signals comprising:
financial signals;
sensitive information signals;
action signals;
urgency signals;
deadline signals;
keyword signals; and
syntax signals
wherein aggregating the first set of behavior signals into the first behavioral model comprises:
calculating a first n-dimensional vector representing average frequencies of financial signals, sensitive information signals, action signals, urgency signals, deadline signals, keyword signals, and syntax signals in each message in the first corpus of messages; and
associating the first n-dimensional vector with the first behavioral model;
wherein correlating sequences of words in the first message with the second set of behavior signals comprises:
scanning the first message for the second set of behavior signals comprising:
financial signals;
sensitive information signals;
action signals;
urgency signals;
deadline signals;
keyword signals; and
syntax signals; and
further comprising, during the second time period:
calculating a second n-dimensional vector representing frequencies of financial signals, sensitive information signals, action signals, urgency signals, deadline signals, keyword signals, and syntax signals in the first message; and
in response to detecting a difference between the second n-dimensional vector and the first n-dimensional vector exceeding the first threshold, restricting access, by the first recipient account, to the first document in the first message.

10. The method of claim 9, further comprising:
recalculating the first n-dimensional vector based on the second n-dimensional vector; and
in response to recalculating the first n-dimensional vector, associating the first n-dimensional vector with the first behavioral model.

11. The method of claim 1:
further comprising, during the second time period:
detecting a first workflow based on:
the first user account;
the second set of behavior signals;
the first set of document tags; and
the first recipient account; and
wherein retrieving the first set of data access policies comprises retrieving the first set of data access policies:
associated with the first set of document tags; and
corresponding to the first workflow.

12. The method of claim 1, further comprising:
during the first time period:
accessing a second corpus of messages sent from a group of user accounts comprising the first user account;
correlating sequences of words, in messages of the second corpus of messages, with a fourth set of behavior signals;
aggregating the fourth set of behavior signals into a group behavioral model representing combinations of behavior signals, in the fourth set of behavior signals, characteristic of behavior in messages sent from the group of user accounts; and
associating the group behavioral model with the group of user accounts; and
during the second time period, in response to detecting a difference between the second set of behavioral signals and the group behavioral model exceeding the first threshold, restricting access, by the first recipient account, to the first document in the first message.

13. The method of claim 1, further comprising:
during the first time period, in response to detecting a first number of messages in the first corpus of messages falling below a second threshold quantity:
accessing a second corpus of messages sent from a group of user accounts, comprising the first user account, each user account in the group of user accounts exhibiting a particular identity characteristic;
correlating sequences of words, in messages of the second corpus of messages, with a fourth set of behavior signals;
aggregating the fourth set of behavior signals into the first behavioral model representing combinations of behavior signals, in a combination of the first set of behavior signals and the fourth set of behavior signals, characteristic of behavior in messages sent from the group of user accounts; and
associating the first behavioral model with the first user account.

14. The method of claim 13, further comprising:
during a fourth time period succeeding the second time period, in response to detecting a second number of messages in the first corpus of messages exceeding a third threshold quantity:
accessing the first corpus of messages;
correlating sequences of words, in messages of the first corpus of messages, with a fifth set of behavior signals; and
aggregating the fifth set of behavior signals into the first behavioral model representing combinations of behavior signals, in the fifth set of behavior signals, characteristic of behavior in messages sent from the first user account; and
associating the first behavioral model with the first user account.

15. The method of claim 13, wherein accessing a second corpus of messages sent from a group of user accounts comprises accessing the second corpus of messages sent from the group of user accounts exhibiting the particular identity characteristic comprising finance department membership within an organization.

16. The method of claim 1, further comprising:
during the first time period:
accessing a first subset of messages, of the first corpus of messages, sent from the first user account to the first recipient account;
correlating sequences of words, in messages of the first subset of messages, with a fourth set of behavior signals;
aggregating the fourth set of behavior signals into a second behavioral model representing combinations of behavior signals, in the fourth set of behavior signals, characteristic of behavior in messages sent from the first user account to the first recipient account; and
associating the second behavioral model with the first user account; and
during the second time period, in response to detecting a difference between the second set of behavior signals and the second behavioral model exceeding the first threshold, restricting access, by the first recipient account, to the first document in the first message.

17. The method of claim 1, wherein restricting access, by the first recipient account, to the first document in the first message comprises restricting transmission of the first message to the first recipient account.

18. A method comprising:
during a first time period:
accessing a first corpus of messages sent from a first user account;
correlating sequences of words, in messages of the first corpus of messages, with a first set of behavior signals;
aggregating the first set of behavior signals into a first behavioral model representing combinations of behavior signals, in the first set of behavior signals, characteristic of behavior in messages sent from the first user account;
in response to detecting a first number of messages in the first corpus of messages falling below a second threshold quantity:
accessing a second corpus of messages sent from a group of user accounts, comprising the first user account, each user account in the group of user accounts exhibiting a particular identity characteristic;
correlating sequences of words, in messages of the second corpus of messages, with a second set of behavior signals; and
aggregating the second set of behavior signals into the first behavioral model representing combinations of behavior signals, in a combination of the first set of behavior signals and the second set of behavior signals, characteristic of behavior in messages sent from the group of user accounts; and
associating the first behavioral model with the first user account; and
during a second time period succeeding the first time period:
accessing a first message outbound from the first user account to a first recipient account, the first message comprising a first document as an attachment to the first message;
correlating sequences of words, in the first message, with a third set of behavior signals;
accessing a first set of document tags associated with the first document;
retrieving a first data access policy:
associated with a first document tag in the first set of document tags; and
comprising a first threshold at which access to a document associated with the first document tag is restricted; and
in response to detecting a difference between the third set of behavioral signals and the first behavioral model exceeding the first threshold, restricting access, by the first recipient account, to the first document in the first message.

19. A method comprising:
during a first time period:
accessing a first corpus of messages sent from a first user account;
correlating sequences of words, in messages of the first corpus of messages, with a first set of behavior signals;
aggregating the first set of behavior signals into a first behavioral model representing combinations of behavior signals, in the first set of behavior signals, characteristic of behavior in messages sent from the first user account;
associating the first behavioral model with the first user account;

accessing a first subset of messages, of the first corpus of messages, sent from the first user account to the first recipient account;

correlating sequences of words, in messages of the first subset of messages, with a second set of behavior signals;

aggregating the second set of behavior signals into a second behavioral model representing combinations of behavior signals, in the second set of behavior signals, characteristic of behavior in messages sent from the first user account to the first recipient account; and associating the second behavioral model with the first user account; and during a second time period succeeding the first time period:

accessing a first message outbound from the first user account to a first recipient account, the first message comprising a first document as an attachment to the first message;

correlating sequences of words, in the first message, with a third set of behavior signals;

accessing a first set of document tags associated with the first document;

retrieving a first data access policy:
  associated with a first document tag in the first set of document tags; and
  comprising a first threshold at which access to a document associated with the first document tag is restricted; and in response to detecting a difference between the third set of behavioral signals and the first behavioral model exceeding the first threshold, and in response to detecting a difference between the third set of behavior signals and the second behavioral model exceeding the first threshold, restricting access, by the first recipient account, to the first document in the first message.

* * * * *